United States Patent
Beiser et al.

(10) Patent No.: US 11,741,695 B2
(45) Date of Patent: Aug. 29, 2023

(54) SYSTEM AND METHOD FOR DYNAMICALLY ORDERING VIDEO CHANNELS ACCORDING TO RANK OF ABNORMAL DETECTION

(71) Applicant: QOGNIFY LTD., Ra'anana (IL)

(72) Inventors: Marina Beiser, Kiryat Yam (IL); Yaniv Gurwicz, Givataim (IL); Yaron Shmueli, Kfar-Saba (IL); Guy Baron, Pardesiya (IL); Doron Raifman, Kfar Saba (IL)

(73) Assignee: QOGNIFY LTD., Rana'na (IL)

( * ) Notice: Subject to any disclaimer, the term of this patent is extended or adjusted under 35 U.S.C. 154(b) by 349 days.

(21) Appl. No.: 16/909,839

(22) Filed: Jun. 23, 2020

(65) Prior Publication Data
US 2020/0327788 A1 Oct. 15, 2020

Related U.S. Application Data

(63) Continuation of application No. 15/869,559, filed on Jan. 12, 2018, now Pat. No. 10,706,701.

(51) Int. Cl.
*G08B 13/196* (2006.01)
*G06K 9/00* (2022.01)
(Continued)

(52) U.S. Cl.
CPC ........ *G06V 10/82* (2022.01); *G06F 18/24143* (2023.01); *G06F 18/41* (2023.01);
(Continued)

(58) Field of Classification Search
CPC ........ G08B 13/19693; G08B 13/19615; G08B 13/19682; G06K 9/6254; G06K 9/6274;
(Continued)

(56) References Cited

U.S. PATENT DOCUMENTS

| | | | | |
|---|---|---|---|---|
| 2004/0161133 A1* | 8/2004 | Elazar | ............ | G08B 13/19615 382/115 |
| 2006/0045185 A1* | 3/2006 | Kiryati | ............... | G08B 13/1968 375/E7.123 |

(Continued)

OTHER PUBLICATIONS

Grimson et al., "Using adaptive tracking to classify and monitor activities in a site," Proceedings. 1998 IEEE Computer Society Conference on Computer Vision and Pattern Recognition (Cat. No. 98CB36231). (Year: 1998).

(Continued)

*Primary Examiner* — Edemio Navas, Jr.
(74) *Attorney, Agent, or Firm* — Pearl Cohen Zedek, Latzer Baratz LLP

(57) ABSTRACT

A system and method for dynamically ordering video streams on display in a command and control system according to video content, including obtaining a plurality of video streams captured by a plurality of respective video cameras; extracting features from the plurality of video streams; calculating abnormality scores for the extracted features, wherein each abnormality score measures a likelihood that a corresponding feature is an abnormal feature; calculating a current rank for ordering each of the plurality of video streams based on current and past abnormality scores of the features extracted from the video stream; and displaying a subgroup of the plurality of video streams having the highest subset of current ranks based on abnormality scores.

25 Claims, 17 Drawing Sheets

(51) Int. Cl.

| | |
|---|---|
| *G06K 9/62* | (2022.01) |
| *H04N 7/18* | (2006.01) |
| *G06V 10/82* | (2022.01) |
| *G06V 20/40* | (2022.01) |
| *G06V 20/52* | (2022.01) |
| *G06F 18/40* | (2023.01) |
| *G06F 18/2413* | (2023.01) |
| *G06V 10/764* | (2022.01) |
| *G06V 10/778* | (2022.01) |

(52) U.S. Cl.
CPC ........ *G06V 10/764* (2022.01); *G06V 10/7788* (2022.01); *G06V 20/41* (2022.01); *G06V 20/52* (2022.01); *G08B 13/19615* (2013.01); *G08B 13/19682* (2013.01); *G08B 13/19693* (2013.01); *H04N 7/181* (2013.01)

(58) Field of Classification Search
CPC ........ G06V 20/41; G06V 20/52; G06V 10/82; H04N 7/181
See application file for complete search history.

(56) References Cited

U.S. PATENT DOCUMENTS

| | | | |
|---|---|---|---|
| 2009/0276705 A1 | 11/2009 | Ozdemir et al. | |
| 2011/0205359 A1 | 8/2011 | Lee et al. | |
| 2013/0241730 A1 | 9/2013 | Saitwal et al. | |
| 2014/0130079 A1* | 5/2014 | Arora | H04N 21/21805 725/24 |
| 2014/0376889 A1* | 12/2014 | Eidelman | G11B 27/031 386/326 |
| 2017/0178343 A1 | 6/2017 | Maranatha et al. | |
| 2017/0374402 A1* | 12/2017 | Pogorelik | H04N 21/4756 |
| 2018/0246846 A1 | 8/2018 | Takimoto | |
| 2018/0268224 A1* | 9/2018 | Anami | H04N 21/4756 |
| 2019/0251471 A1* | 8/2019 | Morita | G06N 20/00 |

OTHER PUBLICATIONS

Hautamaki, V, Ismo K, Pasi F., "Outlier detection using k-nearest neighbour graph.", Proceedings of the 17th International Conference on. vol. 3. IEEE, 2004.
Hochreiter, S., & Schmidhumber, J., "Long short-term memory.", (1997). Neural Computation, 1735-1780.
Liu, F. T., Ting, K. M., & Zhou Z.-H., "Isolation Forest.", Data Mining. (2008).
Ramaswamy et al., "Efficient Algorithms for Mining Outliers from Large Data Sets," Sigmoid, 2000.
Rousseeuw, P. J., & Van Driessen, "A fast algorithm for the minimum covariance determinant estimator.", K. (1999). Technometrics, 41; pp. 212-223.
Simonyan, K., & Zisserman, A., "Very Deep Convolutional Networks for Large-Scale Image Recognition.", arXiv, 1409.1556. pp. 1-14.
Tran, D., Bourdev, L., Fergus, R., Torresani, L., & Paluri, M., "Learning spatiotemporal features with 3d convolutional networks.", arXiv preprint, (p. 1412.07+7) (2014). pp. 1-16.
Wang, Y., Wong, J., & Miner, A., "Anomaly intrusion detection using once class SVM.", Information Assurance Workshop (2004).
Wu et al., "Cluster Boosted Tree Classifier for Multi-View, Multi-Pose Object Detection," 2007 IEEE 11th International Conference on Computer Vision. (Year: 2007).
Ahmed, et al., "A decision support engine for video surveillance systems", 2011 IEEE International Conference on Multimedia and Expo, Jun. 2011, pp. 1-6.
European Search Report and Search Opinion for European Application No. EP19151256.5 dated May 24, 2019.

* cited by examiner

SYSTEM AND METHOD FOR DYNAMICALLY ORDERING VIDEO CHANNELS ACCORDING TO RANK OF ABNORMAL DETECTION

This application is a continuation of U.S. patent application Ser. No. 15/869,559 filed Jan. 12, 2018, to issue as U.S. Pat. No. 10,706,701 on Jul. 7, 2020, entitled "SYSTEM AND METHOD FOR DYNAMICALLY ORDERING VIDEO CHANNELS ACCORDING TO RANK OF ABNORMAL DETECTION," which is incorporated by reference herein in its entirety.

FIELD OF THE INVENTION

Embodiments of the invention relate to command and control systems and/or video management systems (VMS) and methods, such as, for example, surveillance systems.

BACKGROUND OF THE INVENTION

As the number of cameras and sensors in video surveillance systems constantly increases, it is a challenge to monitor all the cameras and sensors with a limited number of operators (e.g., human observers). Each operator can monitor only several cameras concurrently and the operator's attention typically degrades over time. Often the content of channels is repetitive with not much importance over long stretches of time (a channel may refer to, for example, a video stream or data from a single camera, sensor or source).

To aid the operators, current surveillance systems use various video analytics engines to detect preconfigured event types automatically and present the detected events to the operators. The video analytics engines may be preconfigured to detect events according to preset event types, e.g. intrusion detection, motion detection, people count, crowd management, camera tamper, etc. However, because these systems are only preconfigured for specific event types, any occurrence that is not preconfigured would not be detected.

Accordingly, there is a need in the art for a surveillance system that foresees and predicts relevant events to be detected, before they are configured by a user, and that prioritize between viewing channels and events.

SUMMARY

According to embodiments of the invention a system and method for dynamically ordering video streams on display in a command and control system according to video content, may include: obtaining a plurality of video streams captured by a plurality of respective video cameras; extracting features from the plurality of video streams; calculating abnormality scores for the extracted features, wherein each abnormality score measures a likelihood that a corresponding feature is an abnormal feature; calculating a current rank for ordering each of the plurality of video streams based on current and past abnormality scores of the features extracted from the video stream; and displaying a subgroup of the plurality of video streams having the highest subset of current ranks based on abnormality scores.

Furthermore, embodiments of the invention may include dynamically updating the current rank for the plurality of video streams in real-time and adjusting the subgroup of the plurality of video streams displayed according to the updated rank.

Furthermore, embodiments of the invention may include generating events with the abnormal features and prioritizing the abnormal events for operators according to the current rank of the video streams associated with those events.

Furthermore, embodiments of the invention may include obtaining feedback from a user regarding the abnormal events, the feedback comprising a user determination as to whether an abnormal event is abnormal or normal.

Furthermore, embodiments of the invention may include reducing the value of the abnormality score associated with features that occur repeatedly in the video streams.

Furthermore, embodiments of the invention may include normalizing the abnormality scores to a scale.

Furthermore, embodiments of the invention may include classifying the abnormal features.

Furthermore, embodiments of the invention may include obtaining feedback from a user regarding the abnormal events, the feedback comprising a user determination as to whether a classification of an abnormal feature is correct; and training the classifier based on the feedback. According to embodiments of the invention, the feedback may include one of: an indication that the abnormal feature should be classified to a different class that is known to the classifier, and a definition of a new classification category for the abnormal feature.

Furthermore, embodiments of the invention may include calculating an abnormality factor, wherein normalizing the abnormality scores is performed using the abnormality factor.

According to embodiments of the invention, extracting features may include using an intermediate layer of activity recognition deep learning classifier.

Furthermore, embodiments of the invention may include smoothing of the abnormality scores.

Furthermore, embodiments of the invention may include decaying the current rank by decaying the abnormality scores of features by a decay factor that increases with the time that has passed since the features were recorded.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
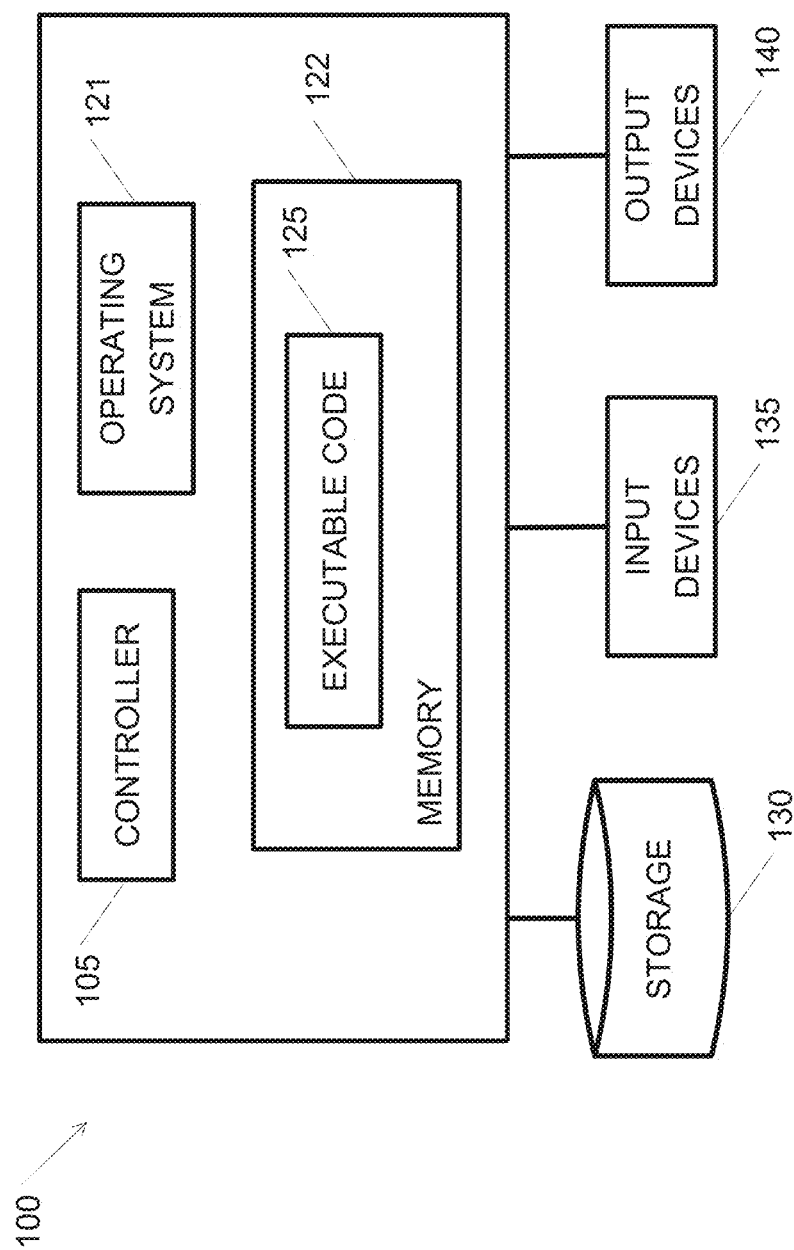
FIG. 1 is a schematic illustration of an example computing device, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may provide a device, system and method for dynamically reordering video streams on a display in command and control systems, such as, surveillance systems. Embodiments of the invention provide a system for predicting and detecting anomalous events, that may be trained e.g., using a training dataset and/or user feedback for online learning. Thus, new anomalous events that were not previously preconfigured, may be detected by the system.

Reference is made to FIG. 1, showing a high-level block diagram of an exemplary computing device according to some embodiments of the present invention. Computing device 100 may include a controller 105 that may be, for example, a central processing unit processor (CPU), a graphics processing unit (GPU), a graphic board able to process a neural network and/or deep learning, a chip or any suitable computing or computational device, an operating system 121, a memory 122, executable code 125, storage or storage device 130, input devices 135 and output devices 140. Controller 105 may be configured to carry out methods described herein, and/or to execute or act as the various modules, units, etc., for example by executing code or software. More than one computing device 100 may be included, and one or more computing devices 100 may act as the various components, for example the components shown in FIGS. 1-3. For example, application server 306, channels rating engine 205, 305, video analytics engine 302 and VMS gateways 334 described herein may be, or may include components of, computing device 100. For example, by executing executable code 125 stored in memory 122, controller 105 may be configured to carry out a method of ranking video channels as described herein.

Operating system 121 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 121 may be a commercial operating system.

Memory 122 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 122 may be or may include a plurality of, possibly different memory units. Memory 122 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 121. For example, executable code 125 may be an application that when executed ranks video and sensor channels as further described herein. Although, for the sake of clarity, a single item of executable code 125 is shown in FIG. 1, a system according to embodiments of the invention may include a plurality of executable code segments similar to executable code 125 that may be loaded into memory 122 and cause controller 105 to carry out methods described herein. For example, units or modules described herein may be, or may include, controller 105 and executable code 125.

Storage device 130 may be any applicable storage system, e.g., a disk or a virtual disk used by a VM. Database 108 may be or may include Storage 130. Storage 130 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 130 and may be loaded from storage 130 into memory 122 where it may be processed by controller 105. In some embodiments, storage device 130 may be used for storing data related to ranking of video data. In some embodiments, some of the components shown in FIG. 1 may be omitted. For example, memory 122 may be a non-volatile memory having the storage capacity of storage 130. Accordingly, although shown as a separate component, storage 130 may be embedded or included in memory 122.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by input devices 135 and output devices 140. For example, a wired or wireless network interface card (NIC), a printer, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 122, computer-executable instructions such as executable code 125 and a controller such as controller 105.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 122 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 100.

Figure 2:
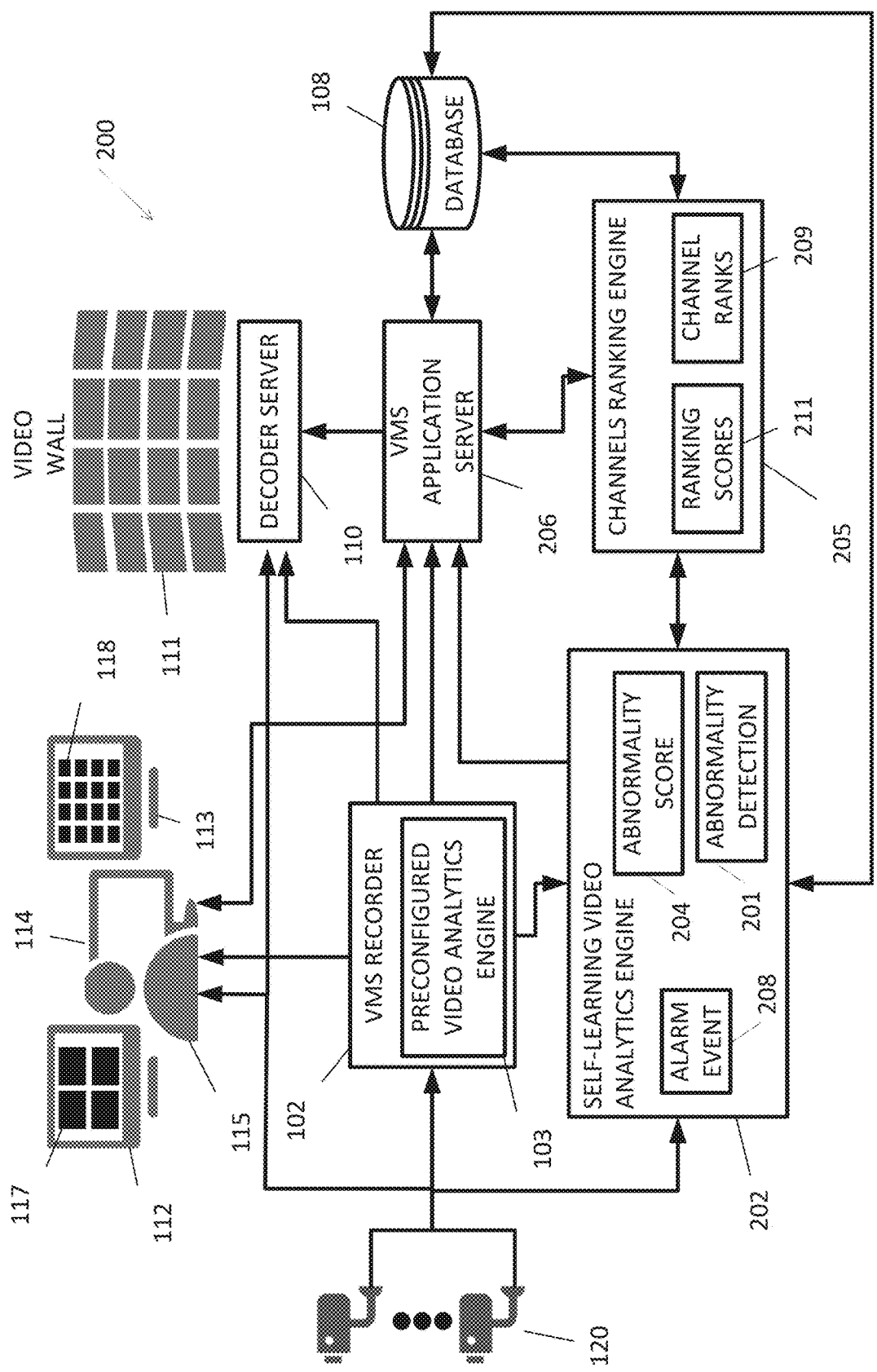
FIG. 2 is a schematic illustration of a system for dynamically reordering video streams on a display, according to embodiments of the invention.

Reference is now made to FIG. 2 which is a schematic illustration of a system 200 for dynamically reordering video streams on a display, according to embodiments of the invention. System 200 may be or may include a VMS system. System 200 may include a plurality of cameras 120 for capturing video data. Cameras 120 may include digital cameras, analog cameras connected to an analog-to-digital (A/D) converter or video encoder, fixed or mobile cameras, cameras of mobile devices, body worn cameras, drones, or any device configured to capture and record image or video data within the device field of view. Cameras 120 may provide video data, or video streams to one or more video management system (VMS) recorders 102. VMS recorders 102 may control the configuration of cameras 120 and may request relevant streams for recording and live monitoring, e.g., for real time analysis by, for example, preconfigured video analytics engine 103 and video analytics engine 202, and/or for live presentation. VMS recorders 102 may distribute video streams to clients, for example, streaming the same or different streams to multiple clients. A client may be a client workstation 115 which may manage video using a workstation connected to one or multiple monitors 112-114. Each monitor may present a plurality of video streams as a plurality of slots 117, 118. Slots 117, 118 may be arranged according to different video layouts of m×n slots, where m and n are any integers, e.g. 1×1, 2×2, 3×4, etc. There may be non-symmetric layouts including one or more larger slots with surrounding smaller ones. A decoder server 110 may be connected to VMS recorders 102 for decoding the video streams. Decoder server 110 may supply video data to be presented on multiple monitors on a video wall 111, acting as a shared resource between operators in a control room. Both decoder server 110 and client workstation 115 may request live video streams (e.g. depicting substantially current or real-time events) and/or playback video streams (e.g., depicting past, previously recorded events) from VMS recorders 102. VMS recorders 102 may stream video to client workstation 115 and to decoder server 110 via respective dedicated streams. In some embodiments video may be streamed directly from cameras 120 to decoder server 110 and/or client workstation 115. For example, System 200 may define channel rating per client (e.g., by channels ranking engine and the relevant video streams may be streamed directly from cameras 120 to the relevant client.

Typically, there are many more cameras or video streams generated in a surveillance system, than there are available slots to display those streams on a monitor. Preconfigured video analytics engine 103 may analyze video streams in real-time and may generate events according to objects and/or logical rules configured for detection, e.g. intrusion detection, motion detection, etc. Different events (as well as the video streams presenting those events) may be sent to application server 206 which may route the events to relevant applications on client workstation 115 or decoder server 110. Application server 206 may automate a video pop-up of a video stream presenting an event to client workstation 115 or decoder server 110. The video pop-up may include the video streams presenting the events and video streams taken by neighboring cameras including live and/or playback streams recorded during the event time period. This automation may involve configuring one or more cameras and designated target viewers, e.g., client workstation 115 and/or decoder server 110.

System 200 may include a self-learning video analytics engine 202 and an abnormality detection application 201. Although preconfigured video analytics engine 103 and self-learning video analytics engine 202 are presented in FIG. 2 as two different physical devices, they may be combined into one unified physical device for analyzing both preconfigured event and learning new events, or may be provided in any other configuration. The self-learning video analytics engine 202 may request a stream either from cameras 120, or from VMS recorder 102. Self-learning video analytics engine 202 may retrieve a live stream from VMS recorder 102, e.g., in real-time, or a playback stream of a past time for investigation purposes. Self-learning video analytics engine 202 may obtain a compressed or uncompressed video stream. If the video stream is compressed, self-learning video analytics engine 202 may decode or decompress the video stream. Self-learning video analytics engine 202 may scale up or down the video frames to a predefined processing resolution or frame rate, and send the raw video frames to abnormality detection application 201.

Abnormality detection application 201 may process the video frames and may generate or calculate an abnormality score 204. Abnormality detection application 201 may issue an alarm event 208 upon detecting an anomaly or abnormality in a video stream and based on abnormality score 204. Alarm event 208 may be sent to the application server 206. Application server 206 may distribute alarm event 208 to relevant clients 115,110 and may automate video pop-up on relevant clients 115, 110 or may initiate other predetermined operations related to the VMS or other systems connected to the VMS.

Abnormality scores 204 related to plurality of video streams may be sent to channel ranking engine 205. Channel ranking engine 205 may obtain notifications updates from abnormality detection application 201. Channel ranking engine 205 may calculate ranking scores 211 and channel ranks 209, and may store them and specific alarm events 208 of all channels at different times in database 108. Channel ranks 209 and specific alarm events 208 may be stored in database 108 so that application server 206 may read channel ranks 209 and specific alarm events 208, and execute logic accordingly. For example, application server 206 may decide which client, e.g., client workstation 115 and/or decoder server 110, to present specific video streams, send specific alarm events 208, etc.

Each of channel ranking scores 211 may be related to a time or time window. A detected abnormality may initially increase the channel ranking scores 211 of the detecting channel by a maximal amount at the time of its occurrence, but the channel ranking scores 211 may decrease as time passes. Channels ranking engine 205 may sort channel ranking scores 211, e.g., in descending order, and store them along with resulted channel ranks 209 in database 108. Once the channel order is updated, channels ranking engine 205 may notify application server 206. Application server may obtain the notification and may read the new channel rank 209 from the database 108.

A user (e.g., a human operator) may receive a notification of a specific abnormal activity (e.g., an abnormal event) which occurs on a video stream. Notifications may be routed to operator's workstation 115 and/or to decoder server 110. The notification may include a pre-defined classification of the abnormal behavior. The classification may be performed by abnormality detection application 201 and routed to channel ranking engine 205 and stored in database 108. Also, the notification sent to application server 206 may include the classification of the abnormal behavior. The classification may be displayed on for example monitors 112-114 or on a video wall 111, e.g., in tiles 117, 118, alongside the associated video stream e.g., as on-screen display (OSD) on top of the displayed video stream. Some of the abnormal behavior events may not fit the classification category represented by the classifier. Some may fit other classification category. The operator may provide a correct classification category, which may be provided as input or feedback to system 200. e.g., to application server 206. Some of the abnormal behavior events may not fit any of the existing classification categories. Such events may be classified by a human operator. The operator may add new classification category and an indication associating the event to the new classification category. The new classification category and association may be provided as input or feedback to system 200, e.g., to application server 206. Application server 206 may store the new classification in database 108. The new classification may be read by the abnormality detection application 201 from database 108. The new classification may be used for the learning phase of the abnormal behavior detection process and for future detection of similar abnormal events.

Figure 3:
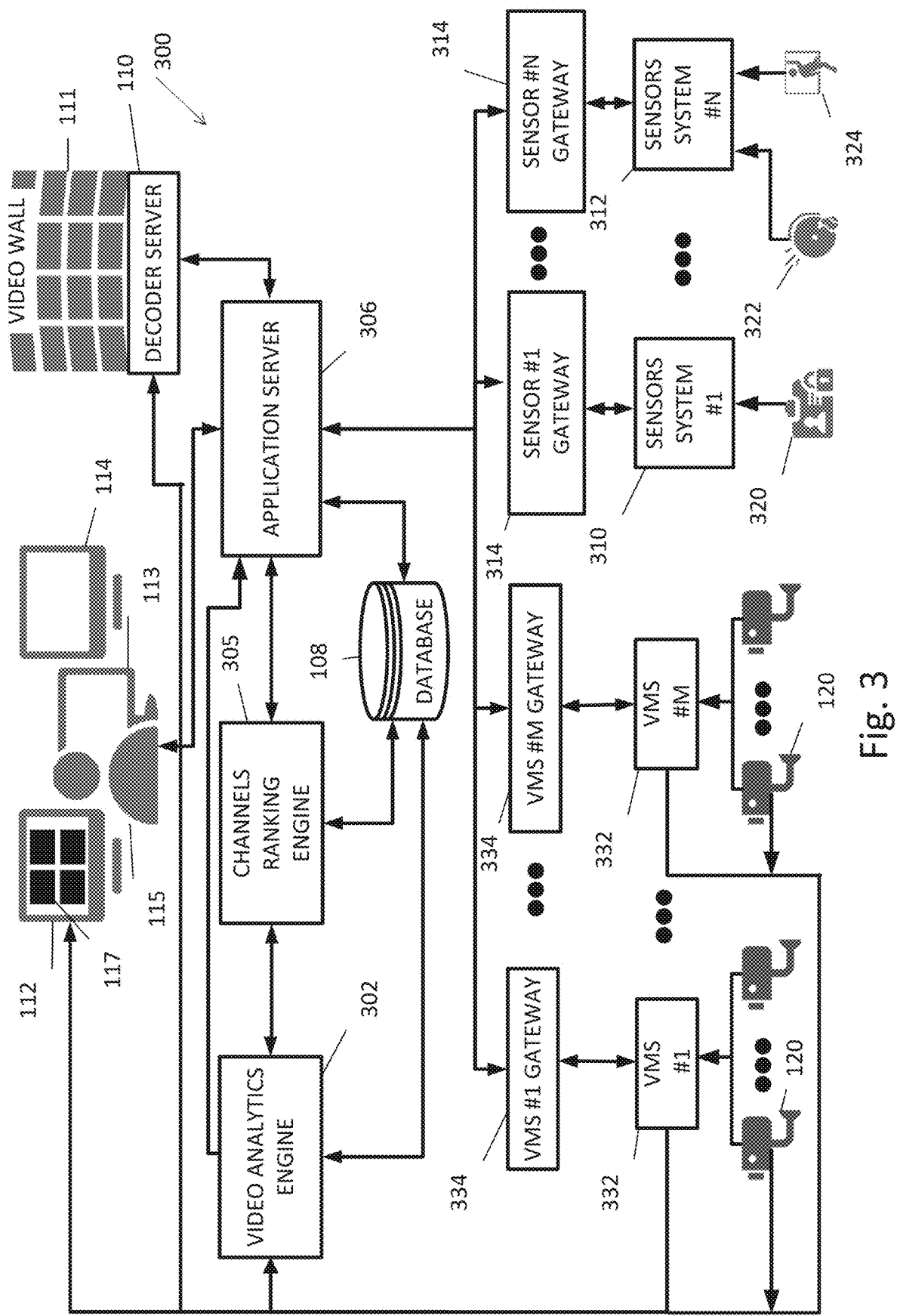
FIG. 3 is a schematic illustration of a system for dynamically reordering video streams and sensors data on a display, according to embodiments of the invention.

Reference is now made to FIG. 3 which is a schematic illustration of a system 300 for dynamically reordering video streams and sensors data on a display, according to embodiments of the invention. According to embodiments of the invention, system 300 also referred to herein as a command and control system, may include a plurality of VMSs 332. System 300 may be a or may include PSIM systems or a Control Room system. For example, a first sub-group of cameras 120 may be connected to a first VMS 332 and other sub-groups of cameras 120 may be connected to other VMSs 332. VMS 332 may be of the same or different types and vendors. In some configurations, some or all VMSs 332 may be connected to application server 306 via a VMS gateway 334. While a single and common application server 306 is depicted in FIG. 3, it is evident to those skilled in the art that other configurations may be utilized. For example, in some embodiments each video stream (e.g., each channel) may have a dedicated VMS application server, and system 300 may include a general application server. Each VMS may generate events such as camera signal loss, video motion detection (VMD), video analytics, etc. VMS gateways 334 may be an intermediate layer for communicating between various VMSs 332 and application server 306. VMS gateways 334 may translate a communication standard and formats of a particular VMS 332 to the communication standard and formats of application server 306.

In some embodiments, system 300 may include a plurality of sensor systems 310,312 connected to application server 306. Examples for sensor systems may include sensor system 310 that may be or may include an access control system (ACS) which may be connected to one or more ACS sensors 320. A second example for a sensor system 312 includes a fire alarm system connected to fire alarm sensors 322 and/or intrusion detection system connected to intrusion detection sensors 324. Each sensor system 310, 312 may be integrated to system 300 via gateways 314. The gateways 334,314 may be bi-directional, communicating data such as sensor data, events from VMSs 332 and sensor systems 310, 312 to application server 306, and data such as commands from application server 306 to VMSs 332 and sensor systems 310, 312. For example, upon an ACS event from sensor 320 an operator may decide to open a door after viewing video channel provided by one of VMSs 332 and approving the person at the door.

Sensor events, e.g., from sensor systems 310, 312, may be stored in the database 108 after being processed by application server 306. Application server 306 may automate actions according to sensor event. For example, application server 306 may present video channels to the operator upon alarm from another sensor, present a page for display including live and playback streams of multiple cameras upon an alarm, etc. Application server 306 may act as an events distributor to its clients.

A user (e.g., a human operator) may log in to system 300, for example, by connecting to application server 306. An operator may have several monitors 112-114 to watch. Each monitor 112-114 may present different content that may change dynamically according to the application flow and to pre-configured actions. For example, monitor 114 may present a geographic information system (GIS) map presenting sensors geographic location and status, e.g., alarm, door open, etc. Monitor 112 may present multiple video tiles 117, e.g., in 2×2 configuration. A centralized video wall 111 may also be controlled and configured by a human operator. Video wall 111 may present video or any other applicable content (maps, sensors, etc.). Video presentation requires streaming video from cameras 120 or VMSs 332 and decoding of the stream. Decoder server 110 may retrieve video streams from VMSs 332. In case an operator requests a specific channel or multiple channels as a page from a selected VMSs 332 to be presented on video wall 111, the request may be sent to application server 306 and to the relevant decoder server 110. Decoder server 110 may request the video directly from the relevant VMSs 332 or from application server 306 and the relevant VMS gateway 334. Each monitor 112-114 and video wall 11 may display video streams and other sensor data obtained from any of the relevant VMSs 332 and/or sensor systems 310 and 312.

Typically, the viewing resources, including operators, monitors and video slots, are much lower in capacity compared to the data volumes provided by cameras 120 and sensors 320, 322 and 324. e.g., typically there are much more video streams and sensors data than available slots. Each human operator has limited number of monitors 112-114 and can handle limited number of sensors 320, 322 and 324 and/or video channels. Handling an incident requires most of the operator attention and may involve multiple sensor data and video channels across monitors 112-114. Once the incident is completed, the operator may return to normal operation tasks, viewing sensors data and video channels. As used herein, an incident may refer to an event that is recognized (by the operator or the system) as requiring management. Examples for incidents may include a terror attack, fire, camera failure, etc. An operator may have a list of tasks that he needs to fulfill to conclude an incident. There may be different incident types and severities. Incident types and severities may be configured by the administrators of system 300 along with the incident procedure for managing the incident, reflecting the organization common operations. Events generated by system 300 may generate incident automatically by, for example, application server 306, or opened manually by an operator.

Channels ranking engine 305 may calculate or derive a ranking of channels and sensors so that application server 306 may distribute video streams and sensor data based on and/or including the corresponding ranking, to each operator. Video streams and sensor data may be displayed on video wall 111 using decoder server 110. When a plurality of events happens at the same time or at overlapping time periods, application server 306 may use the channel ranks 209 to rate and prioritize the events. Typically, a channel with higher channel rank 209 would get or be assigned higher priority, e.g., with higher channel rank would be considered as more important and would have better priority when being presented recorded, etc. Video streams and sensor data related to the event may be presented, and the attention of the human operators may be directed to the event. Over time, the opened event list may change its priorities as the event may end or become less relevant. Thus, channels ranking engine 305 may change channels ranks 209 over time. In some embodiments application server 306 may perform resource management of channels (e.g., video streams) for recording. For example, application server 306 may record channels with higher ranking on specific server(s) or recorders with higher quality, application server 306 may record only high-ranking channels, e.g., channels with ranks above a threshold or a predetermined number of channels having the highest ranks. In some embodiments application server 306 may prioritize open incidents for operators according to the ranks. Managing an incident up to completion may take time, typically from minutes to hours. During the incident management, additional incidents may be opened automatically (e.g., by system 300) or by other operators. Each operator may get a list of open incidents and may have to prioritize the list. The application server 306 may also rate the incidents according to its ranks. Each incident may have a related channel, e.g., video stream or sensor data, and a related content to display. The displayed content may be selected dynamically according to relevance to the incident related sensor data or video stream and the channel ranks 209.

Channel ranking engine 305 may rate, rank or order channels, e.g., video streams or sensor data, based on an abnormality score 204 (also referred to herein as anomaly score or anomalous score) of each of them (e.g., an abnormality score calculated based on features extracted from the video streams or sensor data), for example obtained from video analytics engine 302. The input to channel ranking engine 305 may include for example an abnormality score 204 generated by the Abnormal behavior detector (e.g., anomaly detector 414 depicted in FIG. 4), user feedback (obtained e.g., via application server 306) defining or describing whether an event that has been detected as an abnormal event is indeed an abnormal event, and optionally a category in case an abnormality is detected. In some embodiments, user feedback may indicate that an abnormality was not detected, e.g., that a channel that is presented to the operator as not including any abnormal behavior does include an abnormal behavior. The channel ranks 209 or ordering may be sent to application server 306 which may decide which channels to present to the operators, and may prioritize incidents and recording. In the case of an abnormality, the output category may be presented to the user along with the video or sensor data.

Abnormality scores 204 of video channels and/or sensors, as well as event notifications related to video channels and sensors data may be stored in database 108. In some embodiments, channel rankings engine 305 may obtain one abnormality score per video channel and/or sensor from database 108, and events notifications of present events in real-time from the application server 306 notifications of past or previous events may be obtained from database 108. Additionally, channel rankings engine 305 may obtain current abnormality channels scores from video analytics engine 302. Channel rankings engine 305 may process past and current data to create current channel orderings or ranks 209. The current channel ranks may be send to application server 306. The current channel ranks 209 may be stored database 108 for future processing.

video analytics engine 302 may scale abnormality scores 204 to align or normalize all abnormality scores 204 to the same range or scale e.g., to a scale that is common to other video streams. Video analytics engine 302 may generate events and send event notifications to application server 306. An event notification may trigger an action such as opening new incident, video page for viewing on monitors 112-114 and/or video wall 111, initiate event based recording on a VMS 332, presented event location on the map, etc. The events may be stored in database 108. While a single database 108 is presented in FIG. 3 it may be appreciated by those skilled in the art that more than one databases may be used. For example, in some embodiments each channel may include a dedicated VMS database and another database may be used by system 300.

A human operator viewing a channel triggered by an event or by the channels ranking engine 305 may decide that the event is a false alarm, e.g. the event is not what the automated system characterized it as. The operator may provide feedback to system 300 indicating that the event is a false alarm. The feedback may be provided to application server 306. Application server 306 may route the feedback to channels ranking engine 305. Channel ranking engine 305 may reduce the channel's abnormality score and the channels rank 209 accordingly. Similarly, a human operator may provide feedback to system 300 indicating that a classification category of an event is wrong or provide a new classification category. The human operator may provide a correct existing classification category or a new classification category. The classification category may be sent to application server 306, to channels ranking engine 305 and to video analytics engine 302. Video analytics engine 302 may use this classification for self-learning proposes and for correcting past classifications and performing future classifications. The new classification may be stored in database 108.

The video path to video analytics engine 302 and/or to clients such as workstation 115 and decoder server 110 may originate in cameras 120 for real-time live streams and/or playback from a local storage in cameras 120. Live streaming or playback of past video may be performed using VMSs 332. Video may be uploaded to a VMS 332 from cameras 120 and then streamed to video analytics engine 302.

Application server 306 may calculate and provide customized ranking per or according to each operator. For example, in some embodiments each operator may be responsible of or related to a subset of surveillance entities such as cameras 120 and/or sensors 320, 322 and 324. Application server 306 may be provided with or configured to have lists of relevant cameras 120 and/or sensors 320, 322 and 324 for each operator. Application server 306 may sort the relevant cameras 120 and/or sensors 320, 322 and 324 related to a specific operator according to the current channels ranks and send the sorted surveillance entities to client workstation 115 and decoder server 110. Each operator application would then present the relevant channels to the operator based on the sorted list.

Figure 4:
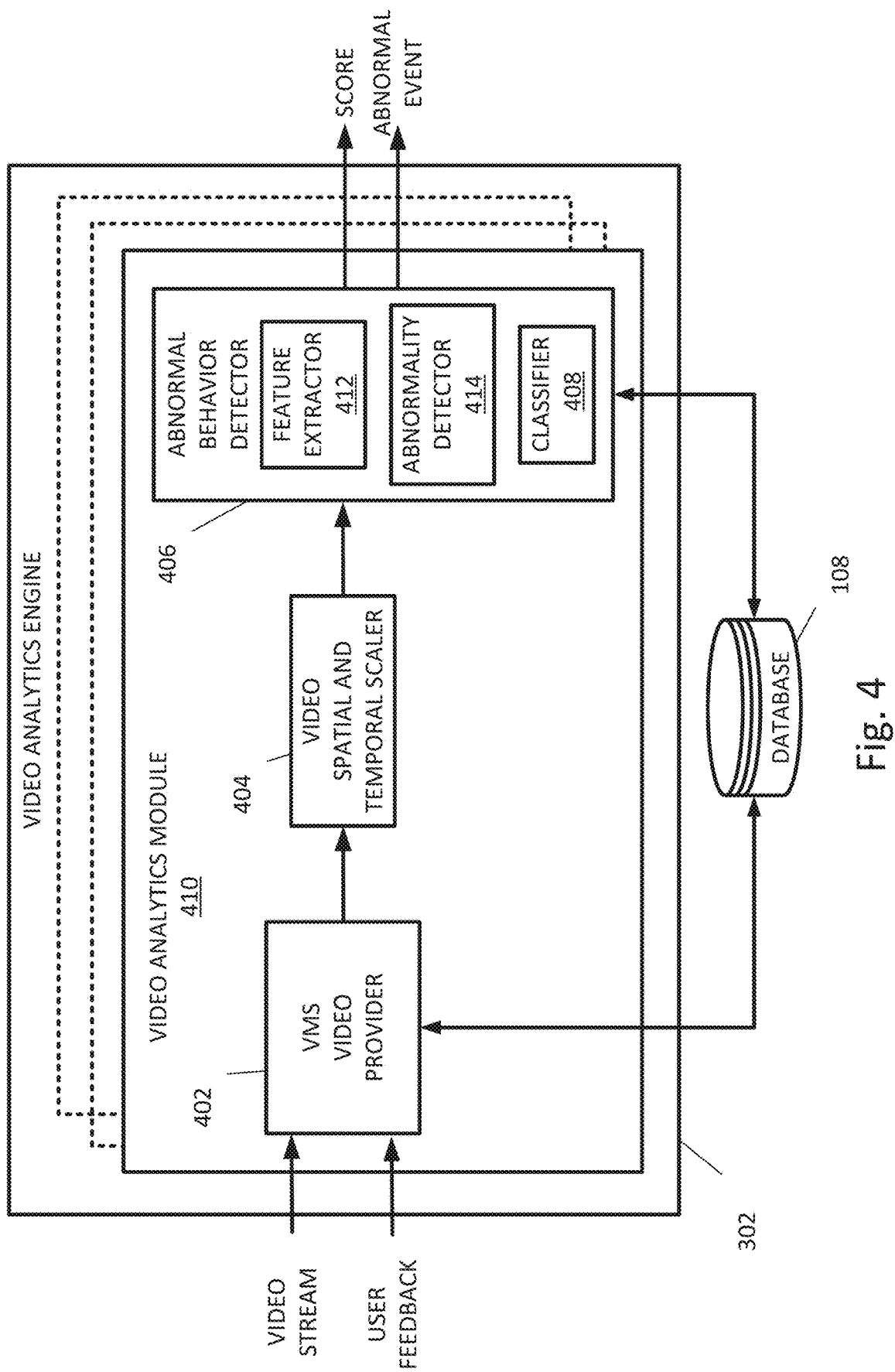
FIG. 4 is a schematic illustration of video analytics engine, according to embodiments of the present invention.

Reference is now made to FIG. 4 which is a schematic illustration of video analytics engine 302, according to embodiments of the present invention. According to embodiments of the present invention, video analytics engine 302 may include a plurality of video analytics modules 410. In some embodiments video analytics engine 302 may include a video analytics module 410 for each video stream or sensor. A video analytics module 410 may include a VMS provider 402, a spatial and temporal scaler 404, and an abnormal behavior detector 406. Video analytics module 410 may be connected to database 108. Database 108 may store current and previous features, their corresponding abnormality scores and user feedback, Abnormal behavior detector related parameters, classifier model and classifier related parameters, and other relevant data.

Video streams may be obtained from any one of cameras 120 or VMSs 102. The video streams may be live or playback. Video streams may be obtained in a compressed format. VMS video provider 402 may decode or uncompress the video stream from the compressed format to a raw video format. VMS video provider 402 may add a time stamp for some or all of the uncompressed frames. VMS video provider 402 may also perform post processing on the uncompressed video frames including color conversion, scaling, de-warping for wide angle lens, etc. VMS video provider 402 may connect directly to a VMS recorder 102 or VMS 332 to retrieve the channel details or metadata, or retrieve it from database 108. The spatial and temporal scaler 404 may obtain the uncompressed video frames and may scale down the resolution and/or the frame rate to reduce computation on the server, enabling more channels per server.

Abnormal behavior detector 406 may analyze the video frames data as will be disclosed herein in detail. Abnormal behavior detector 406 may include a feature extractor 412, anomaly detector 414 and classifier 408. Feature extractor 412 may extract features from the video frames. As used herein features may refer to characteristics of the frames or of objects in the frame, or any attributes that compactly represent video while providing spatiotemporal information. According to embodiments of the invention feature extractor 412 may obtain video frames taken by one of cameras 120. The required numbers of frames for feature calculation depends on the chosen feature. The minimal required number of frames is one.

According to some embodiments, feature extractor 412 may include for example a classifier. However, training a classifier for abnormal behavior detection is impractical due to lack of existing examples. Moreover, many times abnormality determination is scene or context sensitive. In one scene, a running person can be an abnormality while in another it is a normal event. According to some embodiments, feature extractor 412 may include a classifier which had been trained offline for activity recognition, referred to herein as an activity recognition classifier. Such activity recognition classifiers are currently available. According to some embodiments, the features may be the output of an intermediate layer of an activity recognition classifier designed for activity recognition. Thus, embodiments of the invention enable using an activity recognition classifier that was pre-trained for detecting a closed set of actions and use it to create meaningful input to the abnormal behavior detector that can be used to detect anomalous actions that were not necessarily present in the training set. In some embodiments the activity recognition classifier may be trained based on video samples including activities that are not necessarily present in the examined real-life video streams, and on the other hand do not necessarily include the anomalous activities that are likely to be present in the examined video. Other features may be used as well.

Features of past or previous frames may be retrieved from database 108 and processed along with features of current frames to generate an abnormality score. The features may be provided as inputs to anomaly detector 414. Thus, according to embodiments of the invention, abnormal behavior detection may be based on examining features rather than examining video frames. Hence, for example in video, feature extractor 412 may represent complex spatiotemporal information from the video in a manner that is compact yet discriminative for abnormal detection. Using features instead of video frames may reduce computation time as the features are less complex and smaller size (e.g., in bits) than the video frames themselves, and in addition it may also provide more accurate results as the features represent the important information from the video frames.

Anomaly detector 414 may calculate or determine an abnormality score for examined features based on, for example, comparison with previous features stored in database 108. The abnormality score may indicate whether, or the likelihood of whether, the examined feature represents an anomaly or an abnormal behavior, in which case the feature may be considered as an abnormal feature (also referred to herein as anomalous feature). For example, if the abnormality score exceeds a threshold, the feature may be considered as an abnormal feature. In case an abnormal feature is detected in a video stream, an abnormal event may be detected or recognized. An abnormal event may include an event that has been detected an anomalous, irregular or dangerous. An anomalous event may be an event that is irregular from a statistical point of view (e.g., an outlier) with low probability of occurrence. While there is no way of knowing that an anomalous event is indeed dangerous, there is a higher chance that it is dangerous and therefore anomalous events require the attention of a human operator. For example, in a scene where during a learning phase people were not running, a running person may be considered as an abnormality, however, this abnormality may not necessarily be dangerous. On the other hand, it is assumed that all dangerous events will be detected as anomalies as they do not occur regularly. Therefore, every detected abnormality is presented to the operator and the operator decides what to do next.

It should be noted that a process or processor operating similarly to abnormal behavior detector 406 may obtain sensor data, e.g., from sensors systems 310 and 312. Similarly to video, features may be extracted from the sensor data. Examples for features that may be extracted from the sensors data may include average reading, reading above or below a threshold, or other statistics calculated over a sliding window in time. Again, abnormality scores for examined features may be calculated, based on, for example, comparison with previous features stored in database 108. A sensor abnormality score may measure a likelihood that a corresponding sensor feature is an abnormal feature or not. The sensor abnormality scores may be normalized to a scale, e.g., a scale common to all sensors or a scale common to all sensors and video streams. Abnormal features may be classified.

According to some embodiments the score is normalized so a scale common to all video streams (and sensor data), which allows not only detecting anomalies in respect to normal behavior but also ranking abnormal events from different channels with respect to each other. The output score, e.g., the abnormality score, may be sent to channel ranking engine 205,305 (FIGS. 2-3).

In some embodiments abnormal behavior detector 406 may include a classifier block 408 that may classify detected abnormal features into categories. Categories may include violence, running, traffic jam, etc. The associated category may be sent together with the abnormality score to channel ranking engine 205, 305. In some embodiments all channels may include a classifier, in some embodiments only some (or none) of the channels may include a classifier. The classifier may be identical or similar for all channels, or each channel may use a specifically trained classifier, as required.

Some embodiments of the invention enable obtaining feedback from a human operator (a user) regarding the abnormality and its classification category. The feedback may include two parts. One may be an indication on whether the feature is indeed anomalous. The second may be an indication on whether the category of the abnormality is correct, or a suggestion of a new category if the category is not correct. The operator may change the suggested category provided by the system classifier 408 to a different category or define a new category to be updated back to system 300. In some embodiments, classifier 408 may not be pre-trained, or may not be able to classify and abnormal feature, and thus may not provide a classification at all. In this case the user may provide a classification category for the abnormal feature as feedback. Classifier 408 may determine a category for an abnormal feature based on previous user annotations or classifications provided by the user feedback. Classifier 408 may be updated, e.g., classifier related parameters may be updated based on the user feedback.

Figure 5A:
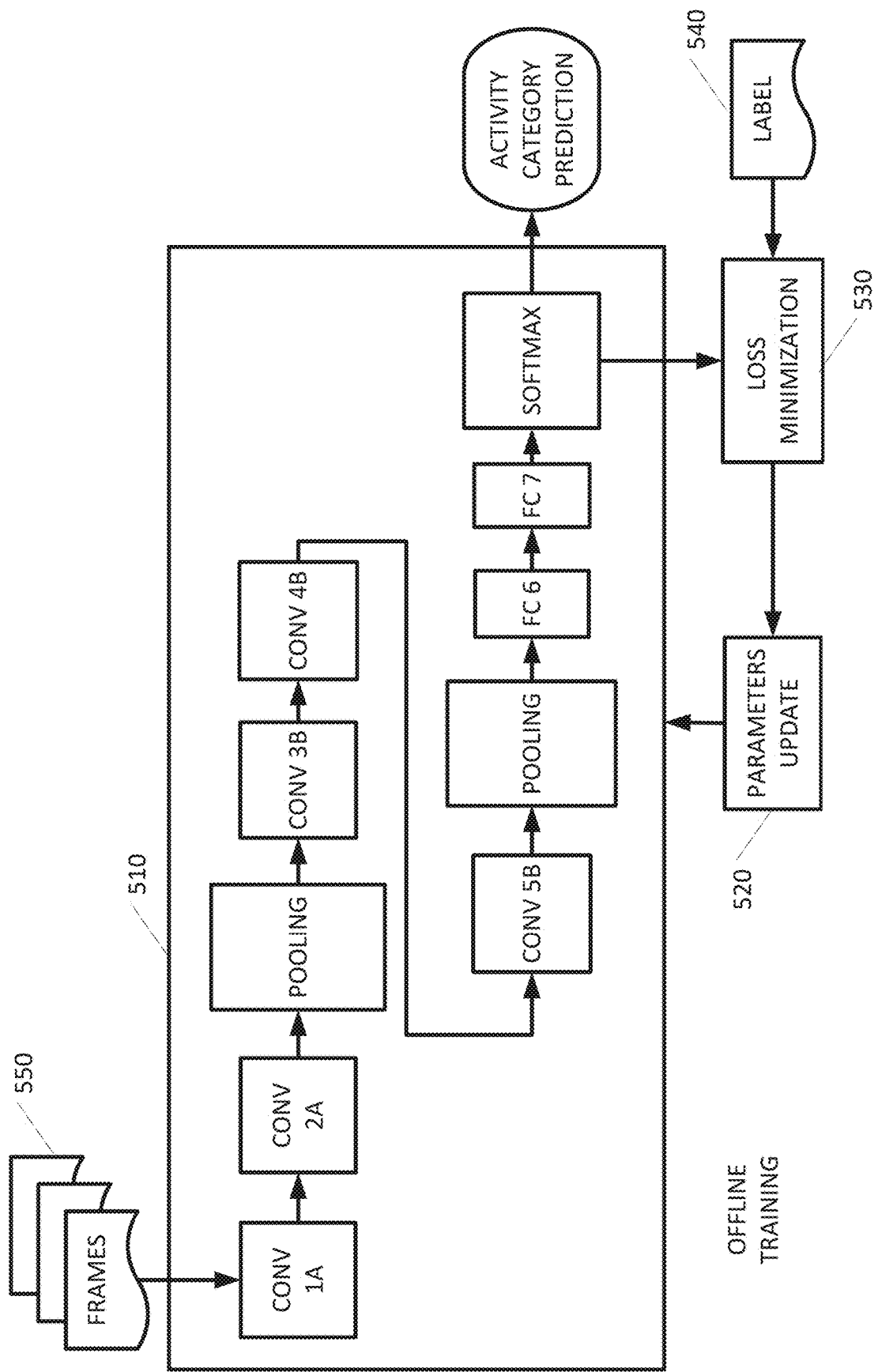
FIG. 5A is a schematic illustration of an activity recognition classifier in a training stage, according to embodiments of the present invention.
Figure 5B:
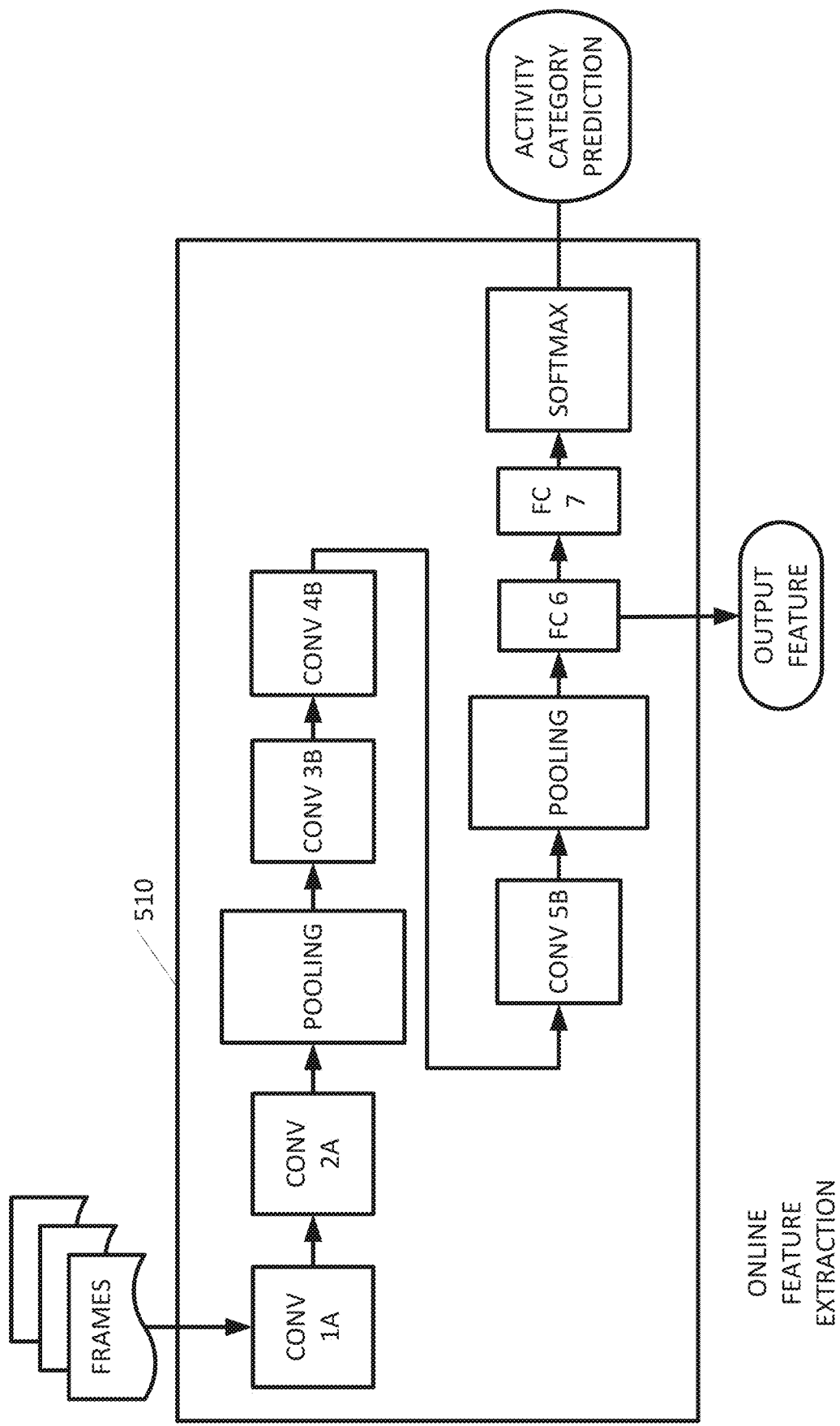
FIG. 5B is a schematic illustration of an activity recognition classifier in feature extraction stage, according to embodiments of the present invention.

Reference is now made to FIGS. 5A and 5B which is a schematic illustration of an activity recognition classifier (that may be used by feature extractor 412) in an off-line training stage (FIG. 5A), and in feature extraction stage (FIG. 5B), according to embodiments of the present invention. Training may be performed offline using databases that include various activities such as: brushing teeth, combing hair running, playing tennis, etc. Usually, the input to the network may include temporal information such as several frames or several optical flow images stacked together. The output may be a classification to one of the different activity classes that the network was trained on. Neural network 510 may be a deep learning convolutional network that may include typical components such as convolutional layers (labeled on FIGS. 5A and 5B as CONV), pooling layers (labeled on FIGS. 5A and 5B as POOLING), and fully connected layers (labeled on FIGS. 5A and 5B as FC). The last layer, labeled on FIGS. 5A and 5B as SOFTMAX may output a vector of the dimension as the number of categories, which assigns probabilities to the different categories. In the training process, the parameters of the network are updated, as indicated in operations 520, towards better accuracy by optimizing a loss function, as indicated in operation 530 whose input is the resulting probabilities from the SOFTMAX layer and the real category label 540. As presented in FIG. 5B, during feature extraction, rather than using the output from the SOFTMAX layer which represents the probabilities for different actions, an output of an intermediate layer may be used. In some embodiments, output of one of the fully connected layers may be used. Since network 510 was trained to distinguish between different kinds of activities, such an intermediate layer may embed important information related to motion and appearance and not confined to the activity categories in the database used for training the network. The output of one of the intermediate layers (e.g., layer FC 6 in FIG. 5B) may be the feature representing the input video frames. The layers coming after the chosen layer may not participate in the computation (e.g., layers FC 7 and SOFTMAX). Typically, it is required for network 510, the video should be from a static camera to eliminate influences from changing background.

Figure 6:
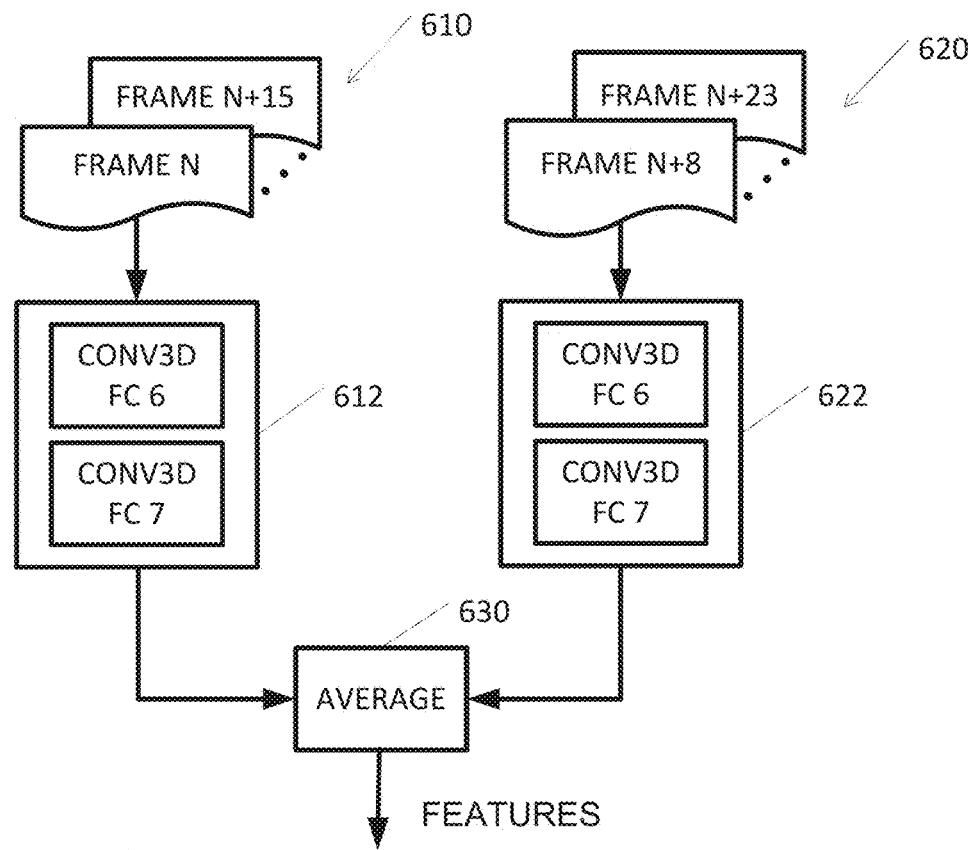
FIG. 6 is a schematic illustration of an implementation of an activity recognition classifier for feature extraction, according to embodiments of the present invention.

Reference is now made to FIG. 6 which is a schematic illustration of an implementation of an activity recognition classifier for feature extraction, according to embodiments of the present invention. The input to the network may include 16 stacked (e.g., organized in a matrix one after another) red green and blue (RGB) frames. The "FC 7" layer or the "FC 6" layer may be used to provide outputs for feature extraction. It is possible to represent more than 16 frames by one feature either by skipping frames (e.g., taking frames n, n+2, n+4, etc.), or by using a plurality activity recognition classifiers, each obtaining a different subgroup of 16 input frames (the subgroups may possibly overlap), and averaging the results of the plurality of activity recognition classifiers, as can be seen in FIG. 6. In FIG. 6, a first group of 16 frames 610 and a second group of 16 frames 620 are used as an input to two activity recognition classifiers, 612, 622. In the example of FIG. 6 group 610 includes frames N to N+15 and group 620 includes frames N+8 to N+23, thus the two groups 610 and 620 include overlapping frames N+8 to N+15. The values of layer "FC 7" or "FC 6" are the output of activity recognition classifiers 612 and 622. As indicated by operation 630, the output features of activity recognition classifiers 612 and 622 are averaged to generate averages features.

Figure 7:
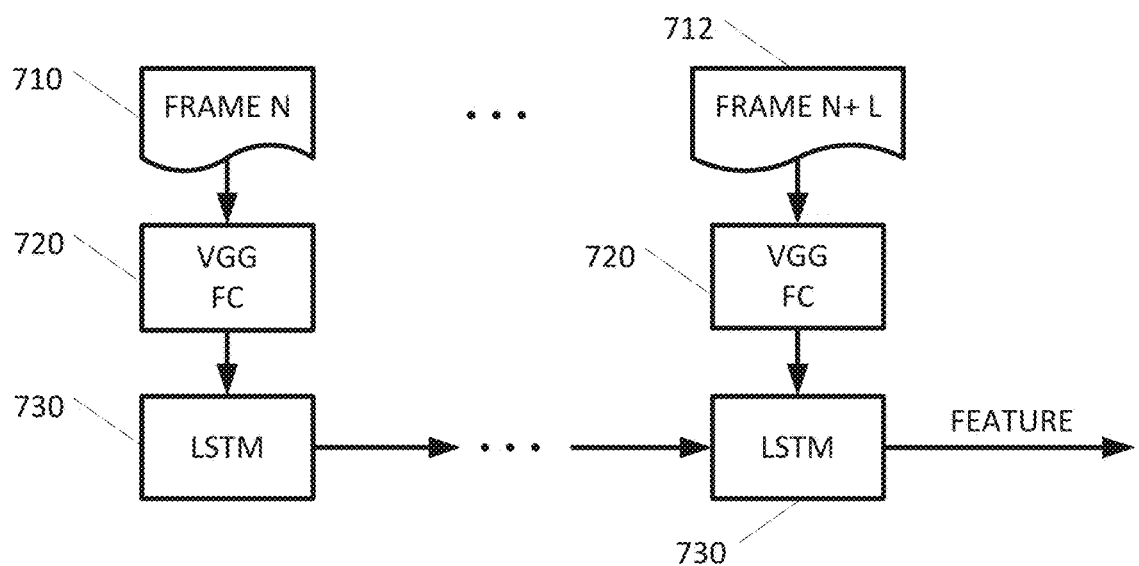
FIG. 7 is a schematic illustration of a second implementation of an activity recognition classifier for feature extraction, according to embodiments of the present invention.

Reference is now made to FIG. 7 which is a schematic illustration of a second implementation of an activity recognition classifier for feature extraction, according to embodiments of the present invention. In this embodiment, a spatial representation is achieved by extracting spatial features from a plurality of frames 710, 712, using a dedicated object classification convolutional network for each frame, such as visual geometry group (VGG) classifier 720. Then, rather than taking the last layer of the VGG classifier 720, an intermediate FC layer may be used as output, for example, one layer before the last. The output of the FC layer may be used as a descriptor of a single frame 710, 712. To achieve temporal representation, the descriptors of the plurality of frames 710, 712 may be used as an input to a recurrent neural network, for example, a long short-term memory (LSTM) neural network 730.

In some embodiments a standard LSTM is used. LSTM is one example of a recurrent neural network. For each LSTM unit, the input may be a sample from a current timestamp and the output of the LSTM unit of sample from the previous time step. Here, the time series may be the result of convolutional neural network of each frame. The length of the time series may equal the number of frames used in the calculation, for example, 50. All LSTM units 730 are units of a single LSTM. Each LSTM unit 730 may represent that at each time step, the output of the LSTM is calculated using the output from the previous time step, together with a current sample.

To obtain the parameters of the LSTM neural network, the LSTM neural network may be trained offline for an activity classification task together with a SoftMax layer added at the end of the LSTM neural network. The SoftMax layer may be added after the hidden layer of the LSTM that is calculated at the last time step. Then in the abnormality detection framework, the last hidden layer of the LSTM is used as a feature.

Figure 8:
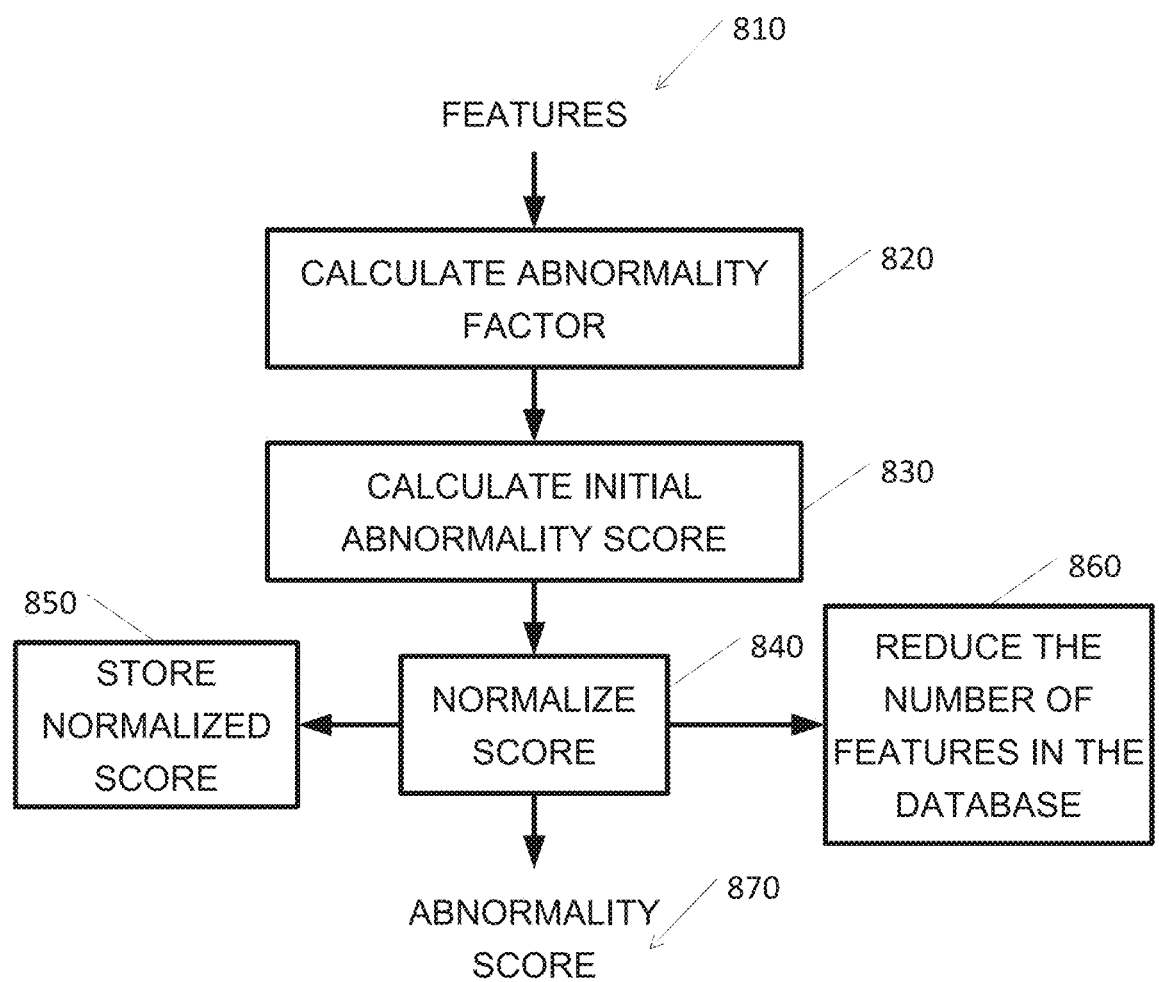
FIG. 8 is a flowchart illustration of a method for calculating an abnormality score, according to embodiments of the invention.

Reference is now made to FIG. 8 which is a flowchart illustration of a method for calculating an abnormality score according to embodiments of the invention. The method may be performed, for example, by anomaly detector 414 depicted in FIG. 4.

In operation 820 an abnormal factor may be calculated. Abnormal factor may be calculated at preterminal time interval and/or when a condition is met, e.g., every predetermined time interval, and/or when a feedback received from a user indicates that a feature was erroneously characterized an anomalous or regular, e.g., when a feature that was characterized as an anomaly represents normal behavior, and vice versa. The abnormal factor may be used to normalize initial abnormality scores of different video streams to the same scale or range so that the different channels may be compared to each other. The abnormal factor may be calculated based on for example features 810, extracted from frames or from sensor data, as disclosed herein. The abnormal factor may be calculated based on past features, e.g., features from previous frames that are known to represent normal behavior. In operation 830 an initial abnormal factor may be calculated. The initial abnormality score may be calculated based on comparison between current and past features, (e.g., past features that are known to represent normal behavior) and on other parameters (e.g., the abnormality factor) obtained in the learning process stored in the database. The initial abnormality score may be calculated for every feature, or for substantially every feature 810. The initial abnormality score may be calculated using any applicable method. For example, the initial abnormality score may be calculated using elliptic envelope, one class support vector machines (SVM), isolation forest and k nearest neighbors (KNN). In operation 840 the initial abnormality score may be normalized or scaled (e.g. to the same scale or range) using the abnormal factor to obtain a normalized abnormality score, also referred to herein as the abnormality score. Normalization may align the normalized abnormality scores of different video streams or sensors to the same scale or range so that the different channels and different detected anomalies may be compared to each other.

In some embodiments a feature may be considered anomalous if its initial abnormality score is higher than the abnormal factor. In these embodiments, the normalized abnormality score may be calculated as follows:

$$S = \frac{C - A_T}{\min(0.1, \text{abs}(A_T))},$$ (Equation 1)

where S is the normalized abnormality score, C is the initial abnormality score, and $A_T$ is the abnormal factor. The minima condition in the denominator avoids division by very small numbers close to zero. In some embodiments, a feature will be considered as anomalous if its initial abnormality score is lower than the abnormal factor. In these embodiments, the normalized abnormality score may be obtained by:

$$S = \frac{A_T - C}{\min(0.1, \text{abs}(A_T))},$$ (Equation 2)

Thus, in both cases, a positive normalized abnormality score corresponds to abnormality and may be referred to herein as anomalous score.

Figure 9:
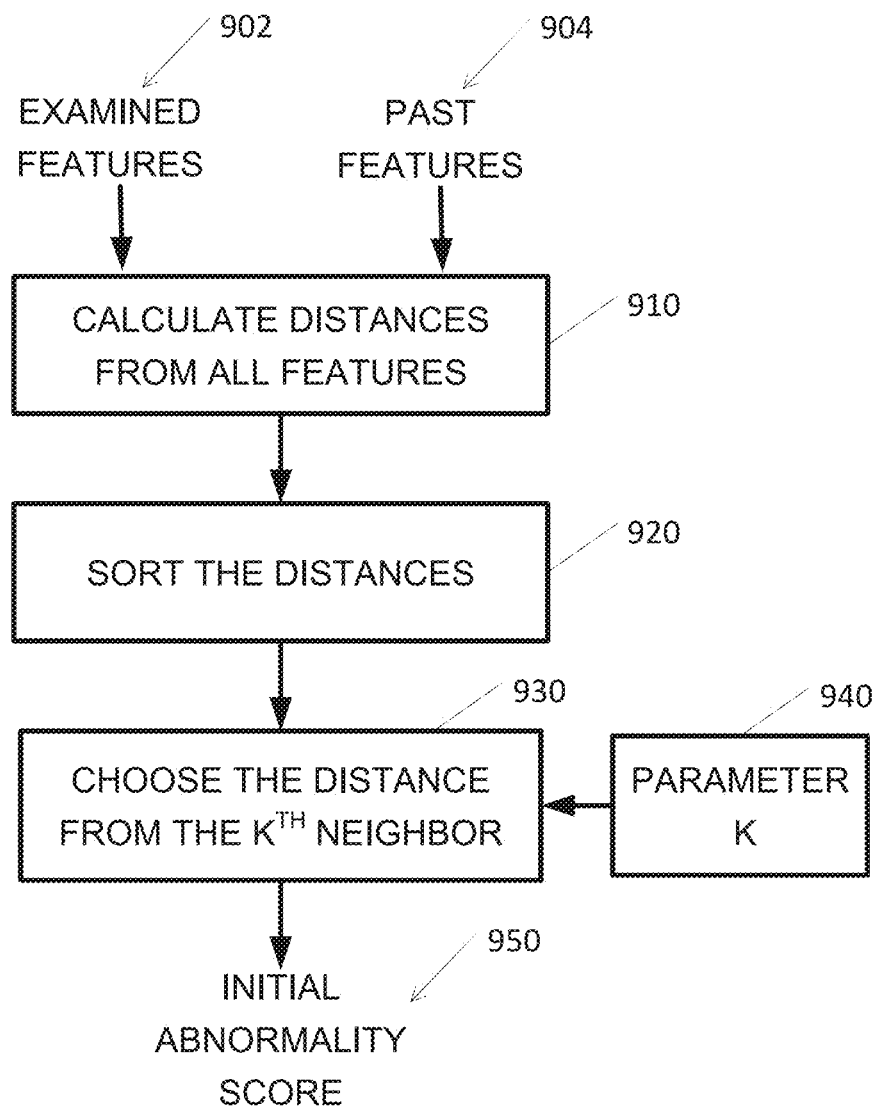
FIG. 9 is a flowchart illustration of a method for calculating an initial abnormality score, according to embodiments of the invention.

Reference is now made to FIG. 9 which is a flowchart illustration of a method for calculating an initial abnormality score, according to embodiments of the invention. FIG. 9 may be a detailed example of operation 830 presented in FIG. 8 using KNN as an Abnormal behavior detector algorithm. While FIG. 9 presents an example for calculating an initial abnormality score using KNN method, embodiments of the invention are not limited in this regards and other methods for abnormal behavior detection may be used, for example, elliptic envelope, one class SVM and isolation forest. In operation 910 distances, such as Euclidian distances, may be calculated between examined feature 902 and the past features 904 representing normal events. In operation 920 the distances may be sorted, e.g., in incremental order. In operation 930, a distance of the examined featured 902 from the k-th closest feature is selected as the initial abnormality score 950, where k is a parameter set in advance. For example, if k=1, then, the initial abnormality score 950 is the distance from the closest feature. If k=2, then the initial abnormality score 950 is the distance from the second closest feature and so own. The rationale behind this calculation of initial abnormality score 950 is that a non-abnormal feature will be close to some of the features in the database that represent normal events. While an abnormal feature will result in high distance as it represents an event that has not been seen before. According to some embodiments 1≤K≤3. However, other values of k may be used.

Returning to FIG. 8, in operation 850 the normalized abnormality score 870 may be stored in database, e.g., database 108, along with the corresponding feature. In optional operation 860, the number of features stored in database 108 may be reduced by omitting or deleting features that are similar to features already stored in database 108. Deleting features from database 108 may reduce the required storage space, and in addition may save computation time during calculation of the initial abnormal factor and the initial abnormality score. A similarity criterion may be defined. For example, very low normalized abnormality score, e.g., normalized abnormality score below a threshold, may be deleted. Features with normalized abnormality score below a predefined threshold may not be sent to database 108 for storage. An example of such threshold may be a predefined number such as −3 or just a threshold that will omit, for example, the 10% of the features with the lowest normalized abnormality scores. The threshold could be adjusted adaptively. Alternatively, it is possible to decide on feature similarity by comparing the current feature with other features in the database in a different manner. For example, distances between a current feature and stored features may be calculated, and features with an averaged distance that is lower than a threshold may not be stored.

Figure 10:
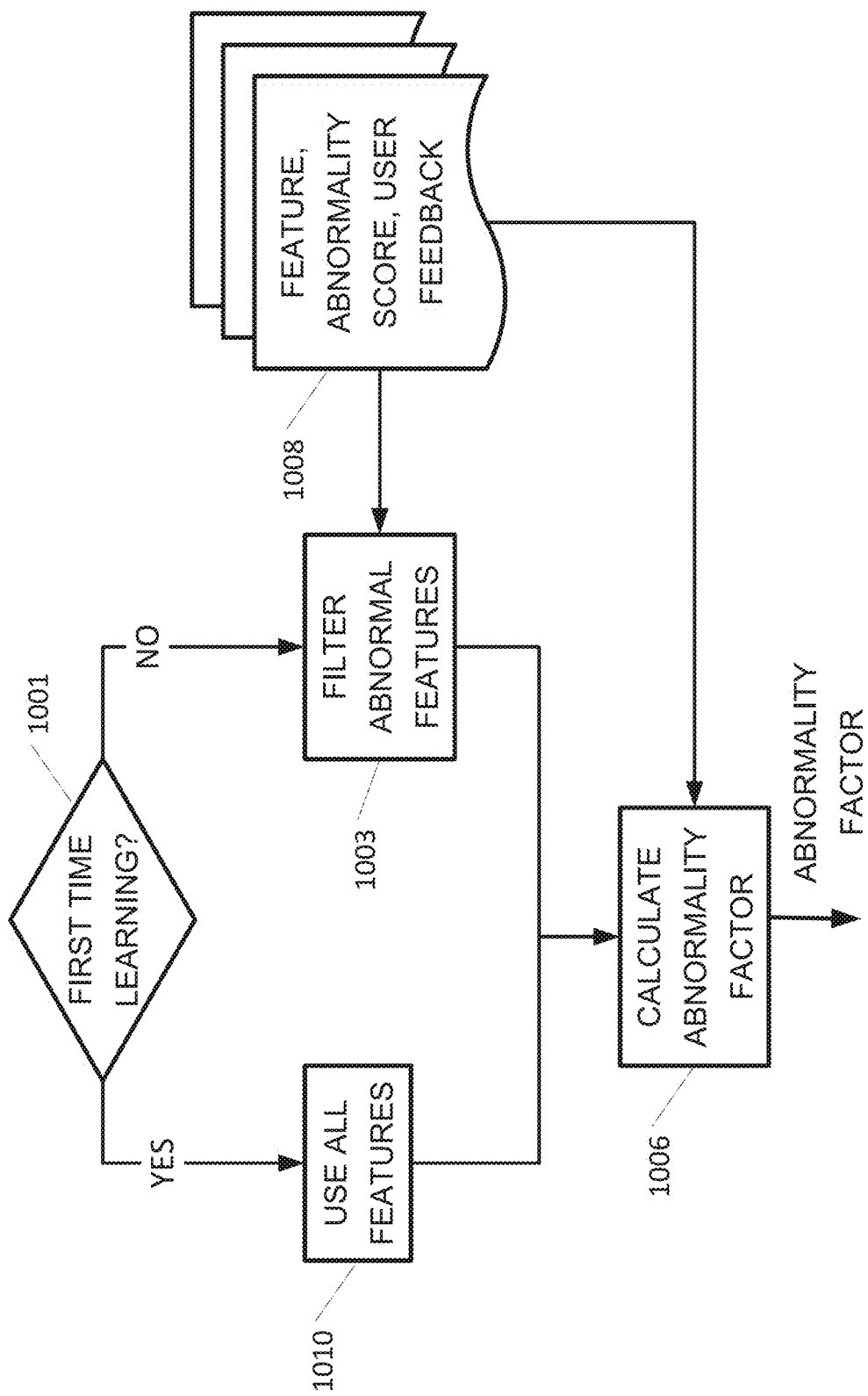
FIG. 10 is a flowchart illustration of a method for selecting features for calculating the abnormal factor, according to embodiments of the invention.

Reference is now made to FIG. 10 which is a flowchart illustration of a method for selecting features for calculating the abnormal factor, according to embodiments of the invention. FIG. 10 may be a detailed example of operation 820 presented in FIG. 8. The abnormal factor may be adjusted dynamically according to past features and user feedback in a learning procedure. In some embodiments, a single abnormal factor may be calculated for a single channel, e.g., for a single video stream or for single sensor. Thus, at each learning update, past non-abnormal features from a predefined time interval or time period before the current feature are used. The predefined time interval may be selected so that sufficient features representing all normal events are likely to be present. For example, if the interval is set to 24 hours, at each learning update, non-abnormal features from the last 24 hours may be used. Thus, it is possible to delete older features from the database. In some embodiments, a plurality of abnormal factors may be calculated for a single channel, e.g., different abnormal factors may be calculated for different times of the day or for different days of the week. Here, the features may be retrieved from database 108 according to their timing, e.g., according the time of the day and/or the day of the week of their timestamps. Thus, features from the same times of the day and the same day of the week as the current time may be used for the learning procedure. This is suitable for scenes where the definition of abnormality depends on the day of the week or on the time of the day. For example, traffic jams are normal events in rush hours but will be considered an abnormality otherwise. Another example is a scene where a presence of people will be suspicious during the night but not during the day. In this mode, it is possible to delete very old features as well.

In operation 1001 it is checked whether it is a first iteration of learning, e.g., a first iteration of determining the abnormal factor. In some embodiments the determination in operation 1001 may be repeated for each abnormal factor of a channel. If this is the first-time learning, and a single abnormal factor is determined for this channel, then past features from a predefined time interval or period occurring before the occurrence of the current feature may be retrieved from database 108 and used for calculating the abnormal factor. If this is the first-time learning, and a plurality of abnormal factors are determined for this channel, then past features from the same times of the day and the same day of the week as the current time may be retrieved from database 108 and used for calculating each of the abnormal factors. The underlaying assumption is that at the beginning of the execution, the video represents normal events only. This may be verified using user feedback.

If this is not the first iteration, then in addition to the time-based selection, there is a filtering of abnormal features, as indicated in operation 1003. The decision to omit abnormal features may be based on the normalized abnormality score related to each feature, and on user feedback obtained in operation 1008. Features with normalized abnormality score above a predetermined threshold are omitted from the learning as they represent anomalous events. The threshold may be determined according to preferences of the operators. For example, meeting the threshold may be determined as being '0' or above. The higher the threshold, less features are omitted (or more varied features are considered as representing normal behavior). In addition, user feedback may also be considered. For example, the system may determine that certain features represent abnormality as they represent a scenario that has not been analyzed before. Yet, a user may indicate that the scenario is a normal event using the user feedback mechanism. In this case, the feature may be used for calculating an abnormal factor despite being predicted as an anomalous.

In operation 1006 an abnormal factor, or a plurality of abnormal factors, may be calculated using the selected features. The specific method of calculation depends on the chosen abnormality algorithm. According to some embodiments operation 1006 may be repeated periodically, e.g., every predetermined time period. According to some embodiments operation 1006 may be additionally initiated if a feedback from a user indicates that the system has identified an event in this channel as an abnormal event while the user indicated that the event does not represent abnormality.

Figure 11:
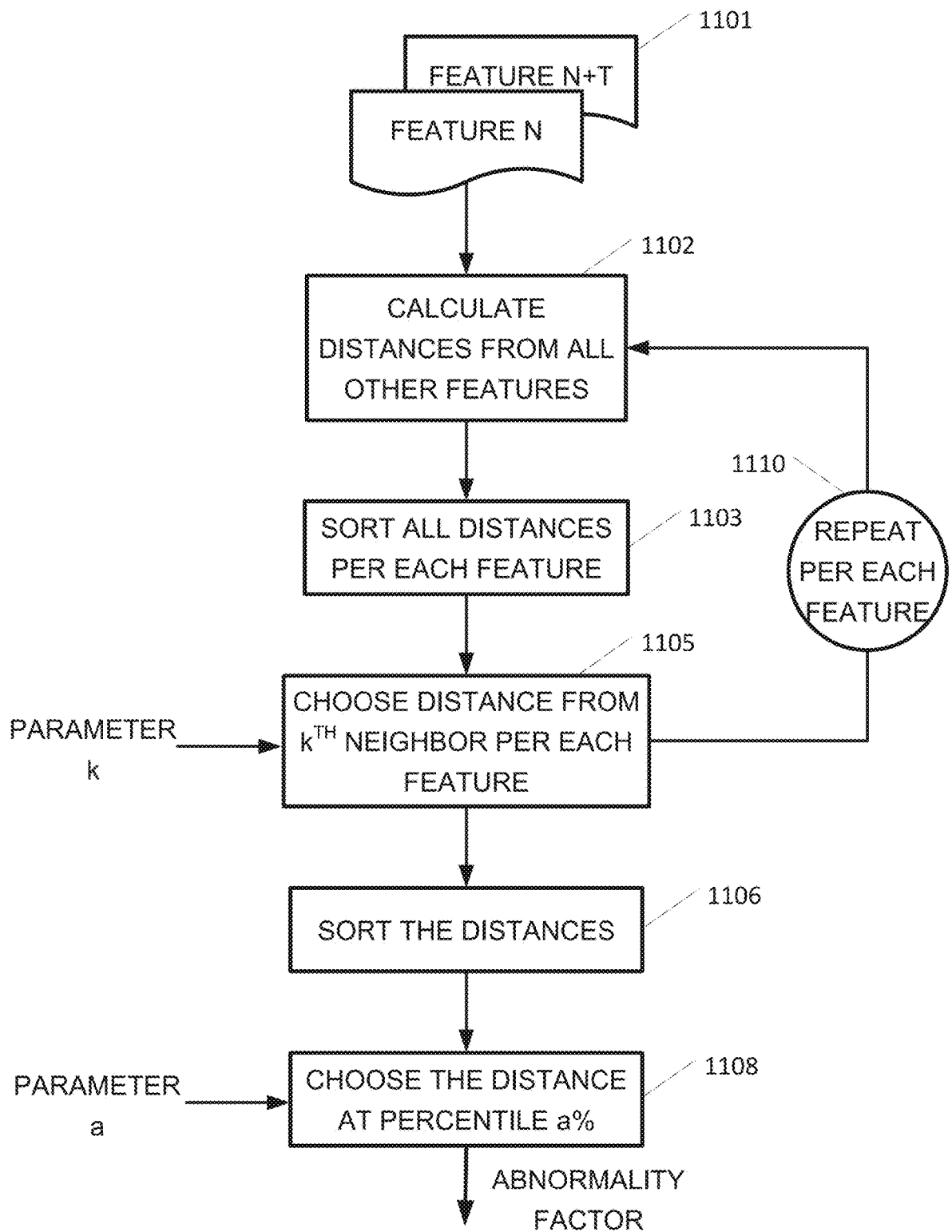
FIG. 11 is a flowchart illustration of a method for calculating the abnormal factor according to embodiments of the invention.

Reference is now made to FIG. 11 which is a flowchart illustration of a method for calculating an abnormal factor according to embodiments of the invention. FIG. 11 may be a detailed example of operation 1006 presented in FIG. 10 using KNN as an abnormal factor calculation algorithm. While FIG. 11 presents an example for calculating an abnormal factor using KNN method, embodiments of the invention are not limited in this regards and other methods for abnormal behavior detection may be used, for example, elliptic envelope, one class SVM and isolation forest. Features 1101 used for abnormality calculation may be selected as described with relation to operations 1010 and 1003 of FIG. 10. In operation 1102 distances may be calculated between each feature and all the other features. If the number of features used for learning is T, then the number of calculated distances may be $T*(T-1)$, in operation 1103 the calculated distances for each feature are sorted, e.g., in incremental order. In operation 1105, the distance from the k-th neighbor may be selected for each feature. K may be a predetermined parameter. As indicated by loop 1110, operations 1102, 1103 and 1105 are repeated for each feature. Thus, each feature is associated with a single distance, and the total number of distances is T. In operation 1106, the T distances (one distance per each feature), are sorted, e.g., in incremental order. In operation 1108, an abnormal factor may be selected at the distance as percentile a % of the distances where a is a predetermined parameter, e.g., a feature with distances above the percentile will be considered as anomalous. For example, in some embodiments a is selected as percentile 100%. In addition, since in typical real-world cases, anomalous samples may result in higher distances than the normal sample with the highest distance (the normal feature whose distance was at percentile 100%), it is possible to add a constant shift to the value obtained from taking the 100% percentile.

Figure 12:
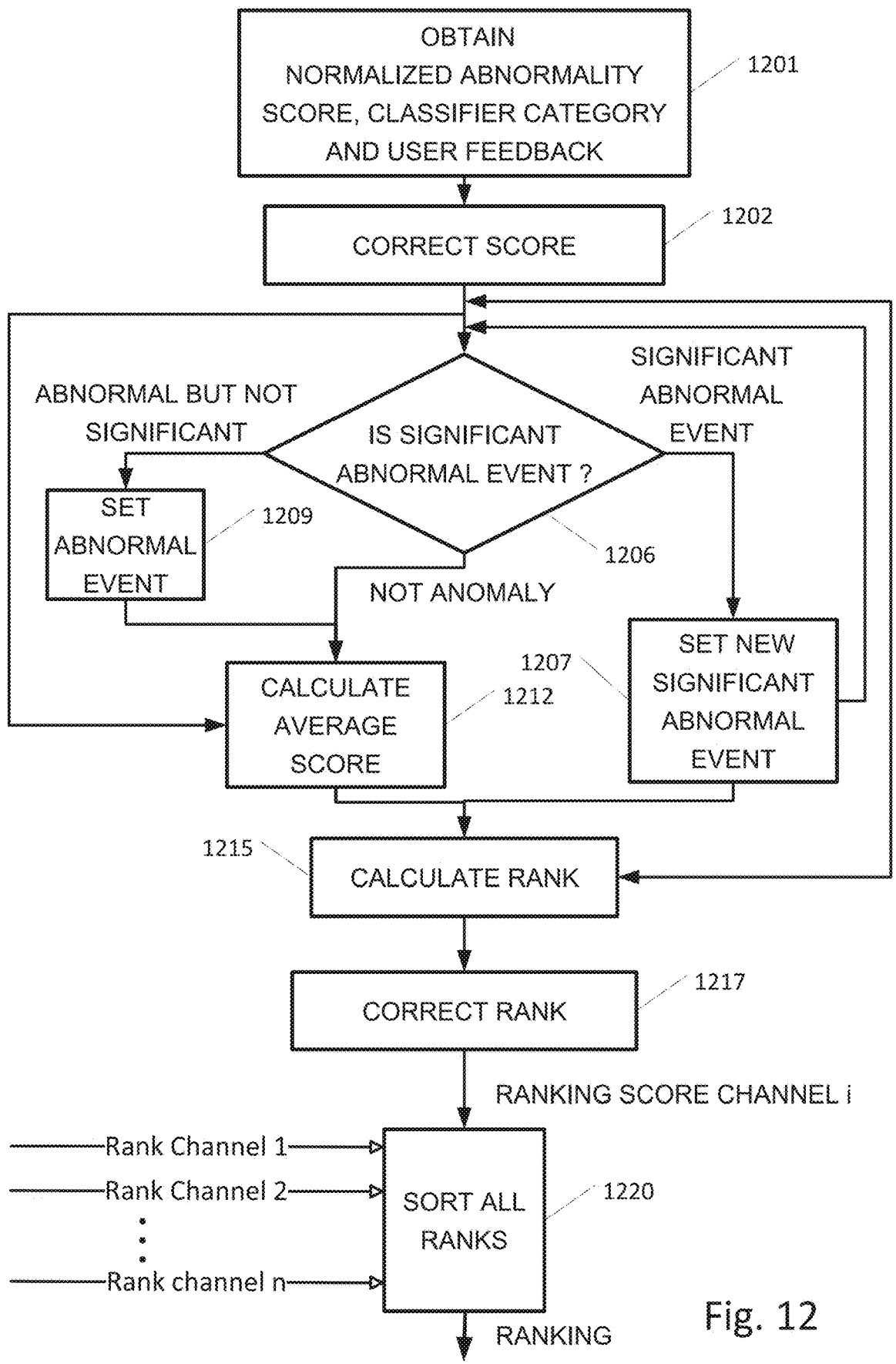
FIG. 12 is a flowchart illustration of a method for channels ranking according to embodiments of the invention.

Reference is now made to FIG. 12 which is a flowchart illustration of a method for channels ranking, according to embodiments of the invention. Channel ranking may be performed, for example by channels ranking engine 205, 305 presented in FIGS. 2 and 3. According to some embodiments, channels ranking engine 205, 305 may so the normalized abnormality scores, e.g., The higher the abnormality score the higher the ranking of the channel should be. However, it may be desirable to decease the influence of fluctuations in the normalized abnormality scores should on the ranking. Otherwise fluctuations in the normalized abnormality scores may result in "jittering" channels which are not so comfortable for the user. Yet, if a normalized abnormality score changes from non-abnormality to abnormality, it is important to increase the ranking of the channel immediately. Other considerations may include decreasing the ranking when the abnormality duration is long. However, it should be possible to distinguish between a prolonged abnormal event and two separated abnormal events that occur at the same channel at close times. Decreasing the ranking when the abnormality duration is long may be desirable since there is a high chance the operator is already aware of the abnormality as this channel had been highly ranked for a significant time duration. In addition, it is assumed that newer abnormal events should be brought to user's attention in higher priority over older abnormal events. FIG. 12 presents an example of a ranking process. However, embodiments of the invention are not limited to this specific ranking method and other ranking processes may be used.

In operation 1201 some or all of the following values for each channel i may be obtained:
1. $S_i$—Normalized abnormality score of channel i, e.g., calculated by anomaly detector 414.
2. User feedback whether indeed the event represents an abnormality or not in case detected as abnormality by the system.
3. Category, e.g., from classifier 408 in case predicted as an abnormality by the system.

In operation 1202 the normalized abnormality score may be corrected. For example, a normalized abnormality score that was tagged by a user as non-anomaly, may be corrected by setting it to a value which represents non-anomaly. e.g., constant value lower than 0. The corrected value may be stored in database 108. Additionally or alternatively, a normalized abnormality score of an abnormal event that was tagged by the user as an abnormality may be reduced, since the event was already brought to the user's attention.

In some embodiments, a normalized abnormality score which is higher than a predetermined threshold, also referred to herein as an abnormality threshold, e.g., 0, $S_i>0$, indicates a likelihood of anomaly. In such case an event may be referred to as "abnormality" or "anomalous event". Embodiments of the invention may refer to a "significant abnormal event" (or a "significant anomalous event") a significant abnormal event may refer to an anomalous event which represents a new or different event. Not every "abnormality" is a "significant abnormal event". In some embodiments, the ranking of a channel may be reduced when the duration of the abnormality is long unless it represents a new anomalous event. The following may be defined:

T—time interval or period within which normalized abnormality scores of the same channel are considered to represent a single event.

"abnormality interaval"—the interval period that begins with a significant abnormal event and ends when there are no anomalies for a time duration of T.

In operation 1206 it may be determined whether a normalized abnormality score, or a normalized abnormality scores as corrected in operation 1202, represents a significant abnormal event. The determination may be performed based on for example the following:

Normalized abnormality score, Si, and its corresponding classifier category (if exists).

$t_{SA_i}$—Time stamp of the last significant abnormal event (e.g., the significant abnormal event that happened most recently).

$t_{A_i}$—Time stamp of the last abnormality (e.g., the last time the normalized abnormality score was higher than the abnormality threshold).

Classifier categories of the anomalies in the current abnormality interval.

Normalized abnormality score of anomalies in the current abnormality interval.

Figure 13:
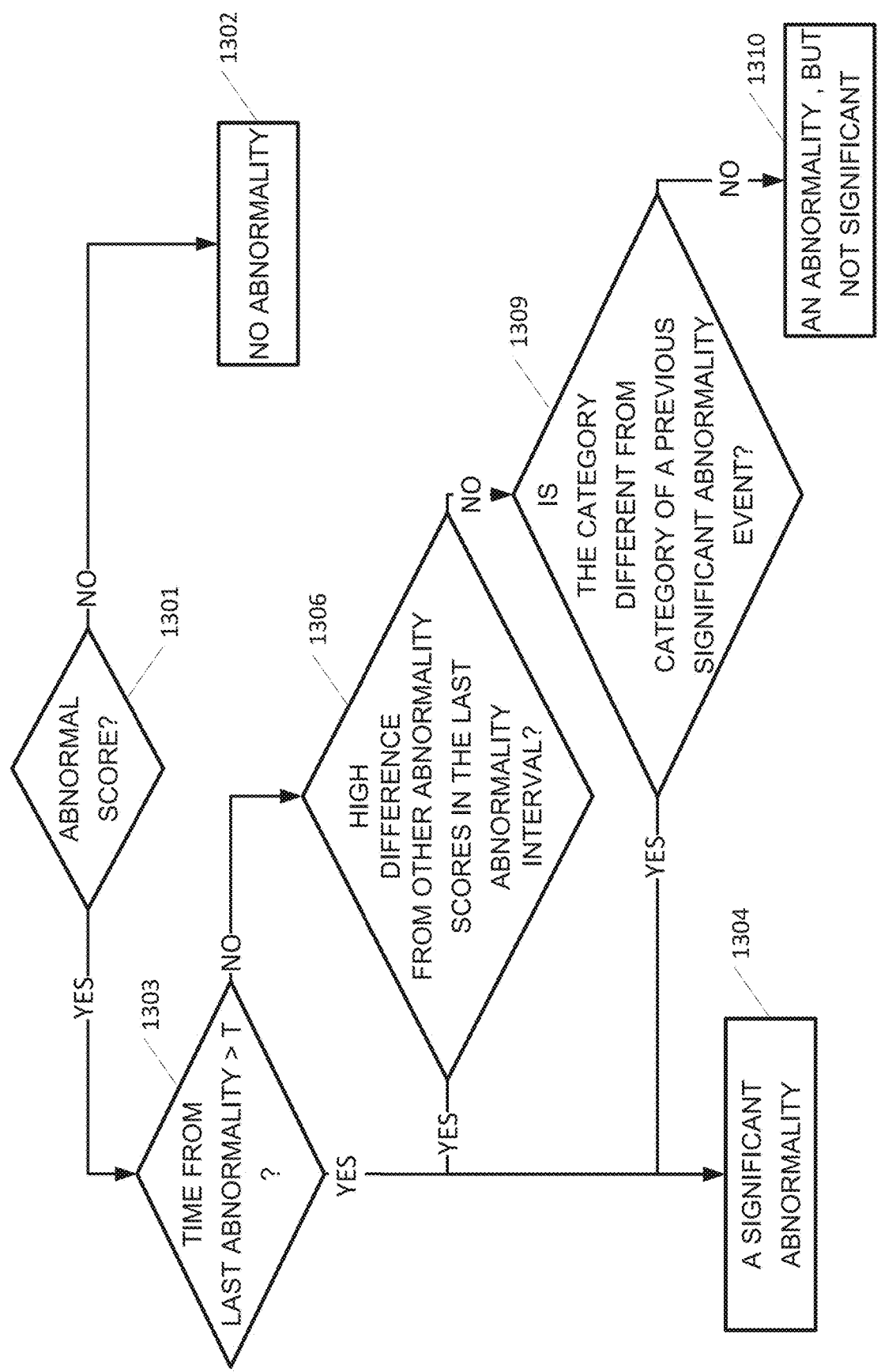
FIG. 13 is a flowchart illustration of a method for determining whether a normalized abnormality score represents a significant abnormal event, according to embodiments of the invention.
Figure 14:
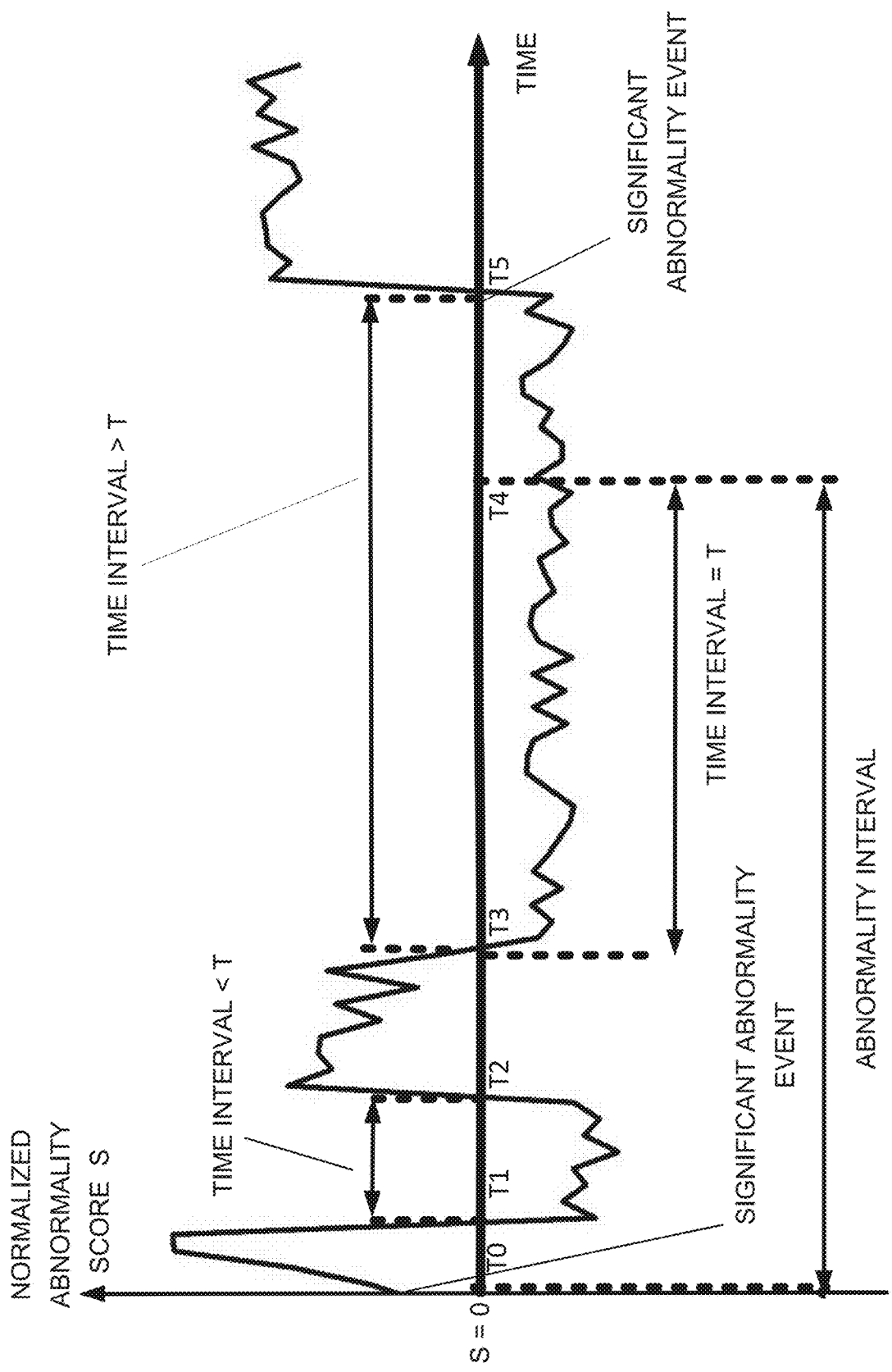
FIG. 14 depicts an example plot of normalized abnormality score verses time.

Operation 1206 will be now described in detail with relation to FIGS. 13 and 14. FIG. 13 is a flowchart illustration of a method for determining whether a normalized abnormality score represents a significant abnormal event, according to embodiments of the invention. In operation 1301 it may be determined whether the normalized abnormality score represents an abnormality, e.g., the normalized abnormality score may be compared with an abnormality threshold. If the normalized abnormality score is above the abnormality threshold it may be determined that the normalized abnormality score represents an abnormal event, and otherwise it may be determined that the normalized abnormality score does not represent an abnormality, as indicated in block 1302. If it was determined in operation 1301 that the normalized abnormality score represents an abnormal event, then in operation 1303 it may be determined if the abnormal event is the first anomalous event that occurs after a time duration of T without anomalies. If indeed the abnormal event is the first anomalous event occurring outside the time frame of an abnormality interval or period, the abnormal event may be considered as a significant abnormal event, as indicated in block 1304. Let $t_c$ denote the current time, then the condition can be written as:

$$t_c - t_{A_i} > T \qquad \text{(Equation 3)}$$

FIG. 14 depicts an example plot of normalized abnormality score verses time. In this example, the anomaly threshold is zero, 0. Values above zero represent anomalies ($S_i>0$). Values below zero represents non-anomalies ($S_i \leq 0$). At time T0=0 the normalized abnormality score above zero thus this is an anomalous event. Since it is a first anomalous event in the channel, the event is considered as a significant abnormal event and $t_{SA_i} = T0$. The event at time T2 is not considered a significant abnormal event as its time difference from the last abnormality (at time $t_{A_i}=t1$) is lower than T (t2−t1<T). In this example, the "abnormality interval" starts at time T0 and ends at time T4 with an interval, from T3 to T4, of duration T free of anomalies. The anomalous event at time T5 is a again a significant abnormal event as it is the first anomalous event after a time duration longer than T, without anomalies, $t_{A_i}$=T3,(T5–T3)>T. Hence $t_{SA_i}$ is set to T5.

Returning to FIG. 13, if at operation 1303 it is determined that the time condition is not satisfied, e.g., the current abnormal event is detected after a time duration of less than T from a previous abnormal event, an anomalous event may still be considered as significant abnormal event despite happening adjacent to previous anomalies. This happens if the anomalous event represents a different kind of event compared with the previous anomalous events. In such case an abnormality interval may be the time interval or period beginning with a significant abnormal event and ending when there are no anomalies for a time duration of T or with another significant abnormal event. In operation 1306 the normalized abnormality score of the current abnormal event may be compared with the normalized abnormality score of the previous abnormal event. If the normalized abnormality score of the current anomalous event is significantly higher (e.g., higher by a predetermined value) than the normalized abnormality score of the previous abnormal event, than it may be determined that the current anomalous event is a significant abnormal event, as indicated in block 1304. This is because a high normalized abnormality score may indicate that the associated anomalous event is of high importance. Specifically, it is verified whether the normalized abnormality score is higher by a threshold ΔS compared with the minimal anomalous score occurring in the abnormality interval: $S_i - S_{imin} > \Delta S$ where $S_{imin} = \min(S_{i_t})$, $t > t_{SA_i}$, $S_{i_t} > 0$.

If at operation 1306 it is determined that the normalized abnormality score of the current anomalous event is not significantly higher than the normalized abnormality score of the previous abnormal event, than in operation 1309, it may be determined whether a category of the present anomalous event is the same or different from the category of the previous anomalous event. If the category of the present anomalous event is the same as the category of the previous anomalous event, then the event may be considered as an anomalous event, but not as a significant abnormal event, as indicated in block 1310. If, however, the category of the present anomalous event is different from the category of the previous significant abnormal event, then the current event may be considered as a significant abnormal event, as indicated in block 1304.

Returning to FIG. 12, the following may be defined:

$C_{A_i}$—Accumulating counter of the number of significant abnormal events in channel i.

$R_i$—The ranking score of channel i. This is an output score calculated operation 2017. Based on this score the channels are ranked.

$M_i$—Time averaged score. An intermediate step in ranking score calculation.

Database 108 may store for example the following information per each channel:

Previous normalized abnormality scores and their corresponding categories (if exist) within the last (e.g. immediately previous) abnormality interval. Older scores may be deleted.

Last averaged score $M_i$.

$t_{SA_i}$—Time stamp of a last significant abnormal event in channel i, may be initially set to –T.

$C_{A_i}$—Counter of the number of significant abnormal events in channel i, may be initially set to zero.

$t_{A_i}$—Time stamp of the last abnormality (e.g., the last time the normalized abnormality score was higher than the abnormality threshold), may be initially set to –T.

Operation 1207 may obtain $C_{A_i}$, counter of the number of significant abnormal events in channel i, as input. If indeed the current normalized abnormality score represents a new significant abnormal event, then in operation 1207 the following may take place, for example:

The time averaged score may be set to be the normalized abnormality score, $M_i=S_i$.

The counter of significant abnormal events may be increased by one $C_{A_i}=C_{A_i}+1$.

The time of the last significant abnormal event $t_{SA_i}$ may be set to the current time $t_{SA_i}=t_C$.

The time of the last abnormal event $t_{A_i}$ may be set to the current time $t_{A_i}=t_C$.

The scores of the previous abnormality interval may be deleted from database 108.

Otherwise, if the current abnormality score is not considered as a new significant abnormal event, but it is still an abnormal event according to the decision in step 1206, then in operation 1209, the time of the last abnormal event $t_{A_i}$ is updated to the current time $t_{A_i}=t_C$. In operation 1212, an average score may be calculated. The average score may be calculated in case of an abnormal event that is not significant or in case of no abnormality. The input to the average score calculation is the previous average score, $M_i$, (which may be stored in database 108), and the current normalized abnormality score $S_i$. The average score may be calculated as a weighted average of the previous average score, $M_i$, and the current normalized abnormality score $S_i$, with a weighting factor, α, according to:

$$M_i = \alpha * M_i + (1-\alpha) * S_i, \quad 0 < \alpha < 1 \qquad \text{(Equation 4)}$$

The higher the weighting factor, α, is, a larger weight is assigned to the past. This produces smoother scores over time but gives less weight to the current score. According to some embodiments the weighting factor may be 0.9<α<0.99. Other calculations and other weighting factors may be used. For example, the normalized abnormality score $S_i$ may be smoothed using a low pass filter.

Ranking scores may be calculated. The inputs to the ranking score calculation may include for example:

$t_{SA_i}$, the timestamp of the last significant abnormal event and $t_{A_i}$, the timestamp of the last abnormal event. This data may be obtained from database 108.

The average score from operation 1209 or 1207 and $t_{SA_i}$ in case $t_{SA_i}$ is updated in operation 1207.

The following is an example of a ranking procedure. Other ranking procedures may be used.

1. A decay factor $D_i$ may be calculated:
   a. Outside the time frame of the abnormality interval $(t_C - t_{A_i} \geq T)$ the decay factor may be set to 1.
      Where $t_c$ denotes the current time.
   b. Inside the abnormality interval $(t_C - t_{A_i} < T)$, the decay factor may be calculated with any function that decays over time. An example for a linear function may be:

$$D_i = \max\left(0, (t_c - t_{SA_i})\frac{C-1}{\tilde{T}} + 1\right), \qquad \text{(Equation 5)}$$

$$0 < C < 1$$

Hence, at the initial time of the abnormality interval at a new significant abnormal event the current time may equal the time stamp of the last abnormality, $t_c=t_{SA_i}$, and thus the decay factor may equal 1, which means no decay). C may be the decay after time $\tilde{T}$ from the last significant abnormal event ($\tilde{T}$ and C may be predetermined constants), where $t_c-t_{SA_i}=\tilde{T}$. In some embodiments C=0.5 and $\tilde{T}$=2*T, however, other values may be used. To guarantee that the decay factor won't be negative if the abnormality interval is longer than $\tilde{T}$, a minimal value of zero is enforced. Another example could be of a nonlinear decay such as:

$$D_i = \exp\left((t_c - t_{SA_i})\frac{\log C}{\tilde{T}}\right) \quad 0 < C < 1 \quad \text{(Equation 6)}$$

Here as well, C may be the decay after time $\tilde{T}$ from the last significant abnormal event.

2. The ranking score may be calculated as for example:

$$R_i = M_i * D_i \quad \text{(Equation 7)}$$

Using an average score, $M_i$, may guarantee that the ranking score. $R_i$, may be smoothed over time, except for a significant abnormal event when average score, $M_i$ may be set to the normalized abnormality score. In addition, Equation 7 may assign higher priority to channels with many anomalies during the abnormality interval over channels with fewer anomalies. The decay factor, $D_i$, may guarantee that the ranking score, $R_i$, may decrease over time inside the abnormality interval.

3. Inside or during the abnormality interval, the ranking score may be limited to be higher than a predetermined value, e.g., 0. For example:

$$R_i = \max(R_i, 0) \text{ unless } (t_c-t_{SA_i}) > 10T \quad \text{(Equation 8)}$$

It may be beneficial to limit the ranking score to be higher than a predetermined value, as a channel during the abnormality interval should be given a higher priority than a channel without recent anomalies. On the other hand, it is desired to have escape condition in case the abnormality interval is very long (e.g., above 10T). For example, it may be determined that the channel ranking is decreased if the abnormality interval is above a predetermined time, e.g., one hour or several hours.

Figure 15:
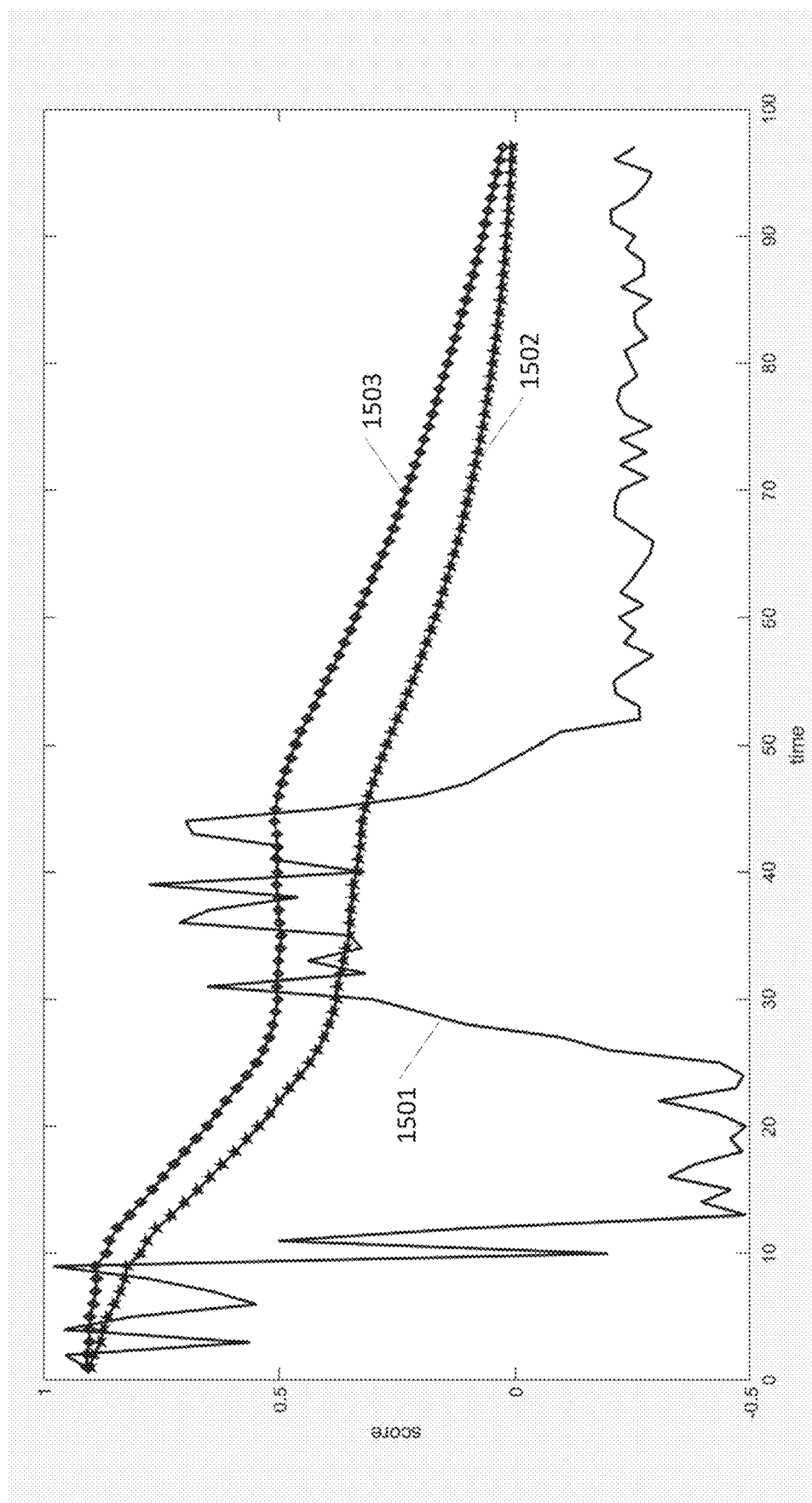
FIG. 15 depicts an example of a normalized abnormality score, an average score and ranking score verses time.

Reference is now made to FIG. 15 which depicts an example of a normalized abnormality score, line 1501, an average score, line 1502, and ranking score, line 1503, verses time. In this example, the average score, line 1502, is calculated with $\alpha$=0.98 and the ranking score, line 1503, is calculated with a linear decay factor.

Further in operation 1215, the values of $t_{SA_i}$, $t_{A_i}$, $R_i$, $M_i$, $C_{A_j}$ may be stored at database 108. At the end of operation 1215 each channel i may have a corresponding ranking score, $R_i$, for $1 \leq i \leq n$, where n is the number of video channels. Ranking scores for the various channels may be calculated in parallel as the computation is independent per each channel.

In optional operation 1217, the ranking scores may be corrected based on the historical number of anomalies in each channel. The input may be the ranking score $R_i$ and the significant abnormal events counter $C_{A_j}$. Thus, the ranking of a channel with many previous anomalies may be decreased. In operation 1220 the ranking scores $R_i$, $1 \leq i \leq n$ are sorted e.g., in descending order to obtain the channels ranks (e.g., channel ranks 209).

Figure 16:
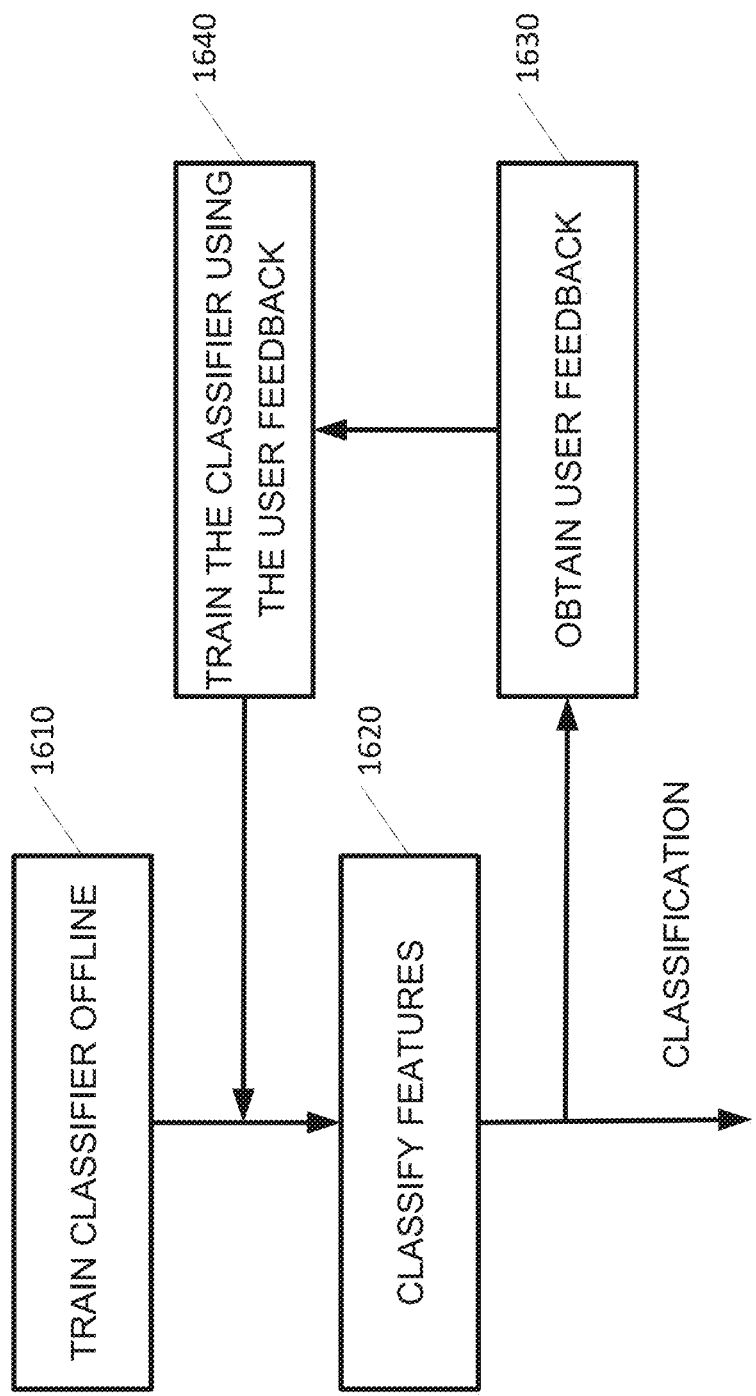
FIG. 16 is a flowchart illustration of a method for classifying features, according to embodiments of the invention.

Reference is now made to FIG. 16 which is a flowchart illustration of a method for classifying features, according to embodiments of the invention. Classifying features may be performed, for example by classifier 408 presented in FIG. 4. In operation 1610 the classifier may be trained offline. For example, features may be generated from database clips that represent classes that may appear as abnormal events such as violence. The features as well as their classifications, also referred to as categories or classes may be provided to the classifier at a training phase. The offline features as well as their corresponding classes may be stored in database 108. The classifier may be trained for all classes for which there are enough examples (an example may include a feature and a corresponding classification). The training may be repeated, and the classifier updated, when there is a class for which the number of examples is higher by a predefined value from the number of examples used for the previous training. Thus, as time passes, more classes may be added, and the classifier may become more accurate. An example for such a classifier type may be SVM. Other classifiers may be used. The output of the training process may include the classifier parameters which may be stored in database 108.

In operation 1620 the classifier may be used to classify features online in real-time. The classifier may obtain a feature, e.g., from feature extractor 412, and may predict a category of abnormal features. In operation 1630 the classifier may obtain feedback from a user. The feedback may define or determine whether a classification of an abnormal event is correct, and may include a correct classification of an abnormal feature. If the correct classification provided by the user is different from the classification provided by the classifier in operation 1620, the classifier may be trained in operation 1640. In some cases, the user feedback may indicate that the abnormal feature should be classified to a different category that is known to the classifier. In other cases, the user may via feedback add or define a new class for an abnormal event. Further training in operation 1640 may be performed every time a feedback is obtained from a user, or after obtaining a predetermined number of corrected classifications from a user. It is noted that offline training (operation 1610) is not mandatory. Without offline training, the classifier may be trained from online examples only, based on feedback form the user. Thus, at the beginning of operation, no classification will be provided. The user may provide categories and classifications in operation 1630, and the classifier may be trained using these categories classifications in operation 1640.

Figure 17:
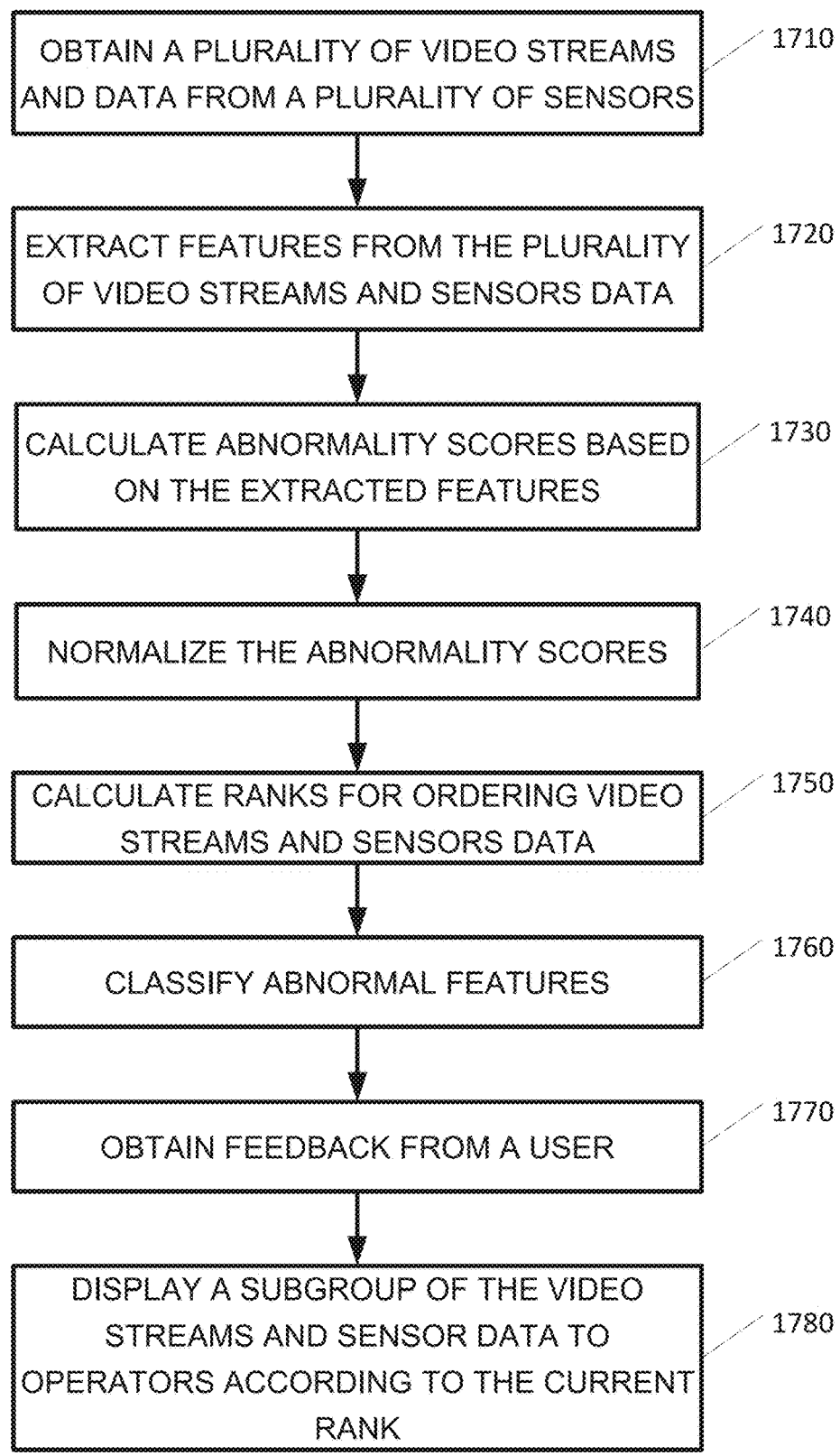
FIG. 17 is a flowchart illustration of a method for ranking channels in a command and control system, according to embodiments of the present invention.

Reference is now made to FIG. 17 which is a flowchart illustration of a method for ranking or ordering channels in a command and control system, according to embodiments of the present invention. In operation 1710, a plurality of video streams, recorded by a plurality of respective video cameras, may be obtained. The video streams may include live video streams and playback of recorded streams. In some embodiments, sensor data may be obtained. In operation 1720 features from the plurality of video streams (or sensor data) may be extracted as disclosed herein. Extracting features may include using an intermediate layer of activity recognition deep learning classifier. Examples for features of sensors data may include average reading, reading above or below a threshold, or other statistics calculated over a sliding window in time. In operation 1730, abnormality scores for the extracted features may be calculated as disclosed herein. The abnormality score may measure, suggest, categorize, or provide a likelihood or probability of, whether or not or to what degree a feature represents an abnormality. In one embodiment, the likelihood may be a continuous value that defines a probability, degree, strength, or certainty, that the associated feature represents an abnormality. Additionally or alternatively, the likelihood may refer to a binary or Boolean determination that the feature represents or does not represent an abnormality (e.g., a continuous value compared to a threshold). Additionally or alternatively, the likelihood may refer to a discrete determination that the feature represents one of an integer number of N classes of abnormality (e.g., a continuous value compared to N−1 thresholds). The value of the abnormality score associated with features that occur repeatedly in the video streams may be reduced. The abnormality scores may be smoothed. In operation 1740, the abnormality scores may be normalized to the same scale or range as other channels, as disclosed herein. An abnormality factor may be calculated, and normalizing the abnormality scores may be performed using the abnormality factor. Normalization to the same range may enable comparing between scores of features of different video streams or different sensors. In operation 1750, ranks for ordering the video streams and/or sensors may be calculated based on current and past abnormality scores (current abnormality scores may refer to abnormality scores of frames that are currently being analyzed, while past abnormality scores may refer to abnormality scores of frames that were previously analyzed), as disclosed herein. The current rank may be dynamically updated for the plurality of video streams in real-time. The current rank may be decayed by decaying the abnormality scores of features by a decay factor that increases with the time that has passed since the features were recorded. Abnormal events with the abnormal features may be generated and prioritized for operators according to the current rank of the video streams associated with those events. In operation 1760, abnormal features may be classified into different categories, e.g., using a classifier. In operation 1770 feedback from an operator regarding the abnormal events may be obtained. The feedback may include a user determination as to whether an abnormal event is abnormal or normal. The feedback may be used for adjusting the channel ranking. In some embodiments, the feedback may indicate whether a classification of an abnormal feature is correct, and the classifier may be trained based on the feedback. The feedback may include, an indication that the abnormal feature should be classified to a different category that is known to the classifier, or a definition of a new classification category for the abnormal feature. In operation 1780, a subgroup of the video streams (or sensor data) may be identified or grouped, and may be displayed or presented, e.g. via an output device such as a video monitor of output devices 140, monitors 112-114 or video wall 111, to operators according to the current ranks. For example, the ranks may be sorted and the subgroup of video streams (or sensors) having the highest (e.g., above threshold) ranks may be displayed, for example, rearranged in slots or monitors in order of rank (or not rearranged but arranged according to their initial or predefined order). Thus, the complementary subgroup of remaining video streams (or sensors) having relatively lower (e.g., below the threshold) ranks may not be displayed, recorded, and/or stored in one or more memories or storage units. Selectively displaying on one or more monitors only the higher rank subgroup of video streams (e.g., in rank order) may improve the surveillance system by automatically highlighting and prioritizing to an operator, the most relevant video streams with the greatest abnormalities. Selectively recording and storing, in one or more memories or storage units (e.g., recorder memories or buffers for playback), only the higher rank subgroup of video streams (e.g., and not the relatively lower rank subgroup of video streams) may reduce storage consumption in the memories or storage units and/or reduce network bandwidth associated with transferring only the subgroup of the video data streams over a network (e.g., from the camera to recorder, from the recorder to storage, and/or from the recorder to a client), resulting in an increase in video streaming and/or viewing quality, rate or efficiency due to the reduced memory consumption and an increase in network speed due to the reduced network bandwidth. Selecting the channels for presentation according to the rank may be performed according to any applicable method. In some embodiments the subgroup may include the channels with the highest ranks that fit the number of available slots according to a selected layout. In some embodiments the subgroup may include the channels with ranks above a threshold and the number of slots may be adjusted accordingly. The subgroup of the plurality of video streams displayed may be dynamically adjusted according to the updated rank. In some embodiments open incidents may be prioritized for operators according to the ranks. In some embodiments resource management of channels for recording may be performed based on the ranks, e.g., channel with higher ranks may have higher priority for recording, the current rank for the plurality of video streams may be dynamically updated in real-time and the subgroup of the plurality of video streams displayed may be adjusted according to the updated rank.

Different embodiments are disclosed herein. Features of certain embodiments may be combined with features of other embodiments; thus, certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus, certain embodiments may be combinations of features of multiple embodiments.

The invention claimed is:

1. A method for selectively recording or transferring video streams over a network according to video content, the method comprising:
obtaining extracted features from a plurality of video streams captured by a plurality of respective video cameras, the extracted features including a feature that is an output of an intermediate layer in-between other layers of a neural network implementing an activity recognition deep learning classifier;
calculating abnormality scores for the extracted features, wherein each abnormality score measures a likelihood that a corresponding feature is an abnormal feature;
calculating a rank for ordering each of the plurality of video streams based on the abnormality scores for the features extracted from the video stream; and
selectively recording or transferring over the network a subgroup of the plurality of video streams having a relatively higher subset of ranks based on abnormality scores, and not recording or transferring over the network a complementary subgroup of remaining video streams having a relatively lower subset of ranks based on abnormality scores.

2. The method of claim 1, wherein selectively recording the subset of the plurality of video streams having the relatively higher subset of ranks reduces storage consumption in one or more recorder storage units compared with recording the plurality of video streams.

3. The method of claim 1, wherein selectively transferring the subset of the plurality of video streams having the relatively higher subset of ranks reduces associated bandwidth over the network compared with transferring the plurality of video streams.

4. The method of claim 1, wherein the subgroup of the plurality of video streams having the highest subset of ranks are the video streams with ranks above a threshold or a predetermined number of video streams having the highest ranks.

5. The method of claim 1, comprising dynamically updating the rank for the plurality of video streams in real-time.

6. A recorder for selectively recording video streams according to video content, the recorder comprising:
   one or more processors configured to:
      obtain extracted features from a plurality of video streams captured by a plurality of respective video cameras, the extracted features including a feature that is an output of an intermediate layer in-between other layers of a neural network implementing an activity recognition deep learning classifier;
      calculate abnormality scores for the extracted features, wherein each abnormality score measures a likelihood that a corresponding feature is an abnormal feature;
      calculate a rank for ordering each of the plurality of video streams based on the abnormality scores for the features extracted from the video stream; and
      selectively record a subgroup of the plurality of video streams having a relatively higher subset of ranks based on abnormality scores and not record a complementary subgroup of remaining video streams having a relatively lower subset of ranks based on abnormality scores.

7. The recorder of claim 6 comprising one or more storage units, wherein the one or more processors are configured to selectively record the subset of the plurality of video streams having the relatively higher subset of ranks in the one or more storage units to reduce storage consumption compared with recording the plurality of video streams.

8. The recorder of claim 6, wherein the one or more processors are configured to selectively transfer over the network the subgroup of the plurality of video streams having the relatively higher subset of ranks and not transfer over the network the complementary subgroup of remaining video streams having the relatively lower subset of ranks.

9. The recorder of claim 6, wherein the subgroup of the plurality of video streams having the highest subset of ranks are the video streams with ranks above a threshold or a predetermined number of video streams having the highest ranks.

10. The recorder of claim 6, wherein the one or more processors are configured to dynamically update the rank for the plurality of video streams in real-time.

11. A network device for selectively transferring video streams over a network according to video content, the network device comprising:
   one or more processors configured to:
      obtain extracted features from a plurality of video streams captured by a plurality of respective video cameras, the extracted features including a feature that is an output of an intermediate layer in-between other layers of a neural network implementing an activity recognition deep learning classifier,
      calculate abnormality scores for the extracted features, wherein each abnormality score measures a likelihood that a corresponding feature is an abnormal feature;
      calculate a rank for ordering each of the plurality of video streams based on the abnormality scores for the features extracted from the video stream; and
      selectively transfer over the network a subgroup of the plurality of video streams having a relatively higher subset of ranks based on abnormality scores and not transfer over the network a complementary subgroup of remaining video streams having a relatively lower subset of ranks based on abnormality scores.

12. The network device of claim 11, wherein the one or more processors selectively transferring the subset of the plurality of video streams having the relatively higher subset of ranks reduces associated bandwidth over the network compared with transferring the plurality of video streams.

13. The network device of claim 11 comprising one or more recorders, wherein the one or more processors are configured to selectively record the higher ranking subgroup of the plurality of video streams and not record the complementary subgroup of remaining video streams.

14. The network device of claim 11 comprising one or more recorders, wherein the one or more processors are configured to record the higher ranking subgroup of the plurality of video streams on the one or more recorders with relatively higher quality than the lower ranking subgroup of the plurality of video streams.

15. The network device of claim 11, wherein the subgroup of the plurality of video streams having the highest subset of ranks are the video streams with ranks above a threshold or a predetermined number of video streams having the highest ranks.

16. The network device of claim 11, wherein the one or more processors are configured to dynamically update the rank for the plurality of video streams in real-time.

17. The network device of claim 11, wherein the network device is a recorder that streams the higher ranking subgroup of video streams to one or more client devices.

18. The network device of claim 11, wherein the higher ranking subgroup of video streams are streamed directly from one or more of the plurality of video cameras to one or more client devices.

19. A system for selectively recording or transferring video streams over a network according to video content, the system comprising:
   one or more processors configured to:
      obtain extracted features from a plurality of video streams captured by a plurality of respective video cameras, the extracted features including a feature that is an output of an intermediate layer in-between other layers of a neural network implementing an activity recognition deep learning classifier, calculate abnormality scores for the extracted features, wherein each abnormality score measures a likelihood that a corresponding feature is an abnormal feature, calculate a rank for ordering each of the plurality of video streams based on the abnormality scores for the features extracted from the video stream, and selectively record, at a recorder, or transfer over the network, at a network device, a subgroup of the plurality of video streams having a relatively higher subset of ranks based on abnormality scores, and not record or transfer over the network a complementary subgroup of remaining video streams having a relatively lower subset of ranks based on abnormality scores.

20. The system of claim 19, wherein the network device is a recorder that streams the higher ranking subgroup of video streams to one or more client devices.

21. The system of claim 19, wherein the higher ranking subgroup of video streams are streamed directly from one or more of the plurality of video cameras to one or more client devices.

22. The system of claim 19 comprising one or more storage units in the recorder, wherein the one or more processors are configured to selectively record the subset of the plurality of video streams having the relatively higher subset of ranks in the one or more storage units to reduce storage consumption compared with recording the plurality of video streams.

23. The system of claim 19, wherein selectively transferring the subset of the plurality of video streams having the relatively higher subset of ranks reduces associated bandwidth over the network compared with transferring the plurality of video streams.

24. The system of claim 19, wherein the subgroup of the plurality of video streams having the highest subset of ranks are the video streams with ranks above a threshold or a predetermined number of video streams having the highest ranks.

25. The system of claim 19, wherein the one or more processors are configured to dynamically update the rank for the plurality of video streams in real-time.

* * * * *